(12) United States Patent
Hayakawa et al.

(10) Patent No.: US 6,958,178 B2
(45) Date of Patent: Oct. 25, 2005

(54) HEAT-SHRINKABLE POLYESTER FILM ROLL

(75) Inventors: Satoshi Hayakawa, Inuyama (JP); Norimi Tabota, Inuyama (JP); Yoshinori Takegawa, Ohtsu (JP); Katsuya Ito, Ohtsu (JP); Shigeru Komeda, Osaka (JP); Katsuhiko Nose, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 593 days.

(21) Appl. No.: 10/480,844

(22) PCT Filed: Jul. 30, 2002

(86) PCT No.: PCT/JP02/07746

§ 371 (c)(1),
(2), (4) Date: Jan. 30, 2002

(87) PCT Pub. No.: WO03/039841

PCT Pub. Date: May 15, 2003

(65) Prior Publication Data

US 2004/0191493 A1 Sep. 30, 2004

(30) Foreign Application Priority Data

Aug. 1, 2001 (JP) .......... 2001-233971
Sep. 28, 2001 (JP) .......... 2001-300424

(51) Int. Cl.⁷ .......... B32B 7/00; B32B 27/06; B32B 27/10; B32B 53/00
(52) U.S. Cl. .......... 428/34.9; 428/35.1; 428/212; 428/213; 428/220; 428/480; 428/481
(58) Field of Search .......... 428/34.9, 35.1, 428/212, 213, 220, 480, 481, 316.6, 218, 317.9, 36.5, 36.91, 336

(56) References Cited

U.S. PATENT DOCUMENTS 6,342,281 B2 * 1/2002 Hayakawa et al. ........ 428/35.2
6,451,445 B1 * 9/2002 Ito et al. .......... 428/480
6,663,928 B2 * 12/2003 Ito et al. .......... 428/35.1

FOREIGN PATENT DOCUMENTS

| JP | 61-164709 | 10/1986 |
| JP | 62-091555 | 4/1987 |
| JP | 62-095341 | 5/1987 |
| JP | 63-027235 | 2/1988 |
| JP | 64-004326 | 1/1989 |
| JP | 01-152031 | 6/1989 |
| JP | 04-025408 | 1/1992 |
| JP | 05-287027 | 10/1993 |
| JP | 06-339991 | 12/1994 |
| JP | 08-127024 | 5/1996 |
| JP | 10-180807 | 7/1998 |
| JP | 11-071473 | 3/1999 |
| JP | 11-207818 | 8/1999 |
| JP | 11-279282 | 10/1999 |
| JP | 2000-062019 | 2/2000 |
| JP | 2000-263547 | 9/2000 |
| JP | 2000-327806 | 11/2000 |
| JP | 2001-170987 | 6/2001 |

OTHER PUBLICATIONS

Notice of Reasons for Rejection dated Aug. 3, 2004 for Japanese Patent Application No. 2001–300424 filed Jul. 27, 2004 (with English translation).

* cited by examiner

*Primary Examiner*—Rena Dye
*Assistant Examiner*—Lawrence Ferguson
(74) *Attorney, Agent, or Firm*—Kenyon & Kenyon

(57) ABSTRACT

The heat-shrinkable polyester film rolls according to the present invention is characterized in that the film rolls have (1) a heat shrinkage percentage at 85° C. in the maximum shrinkage direction of 20% or more; (2) a melt resistivity at a temperature of 275° C. of $0.70 \times 10^8$ Ω·cm or less; (3) when samples thereof are cut off at an interval of about 100 m and the fluctuation in thickness in the maximum shrinkage direction is measured, a thickness distribution width represented by the following formula of respective samples of 7% or less.

Thickness distribution width=(Maximum thickness−Minimum thickness)/Average thickness×100

Container-wrapping films excellent in processability and printability can be produced from the heat-shrinkable polyester film rolls in high yield.

16 Claims, 3 Drawing Sheets

HEAT-SHRINKABLE POLYESTER FILM ROLL

TECHNICAL FIELD

The present invention relates to a heat-shrinkable polyester film, in particular a heat-shrinkable polyester film suitable for applications such as labels.

BACKGROUND ART

Heat-shrinkable plastic films are widely used in applications such as shrink packaging, shrink labels, cap seals and the like, due to their characteristic property of shrinking by heat. Among them, polyvinyl chloride, polystyrene, and polyester films are used for labeling, cap sealing, or collective packing various containers such as polyethylene terephthalate (PET), polyethylene, glass, and other containers.

However, polyvinyl chloride films carry problems that they are lower in heat resistance, generate hydrogen chloride gas during incineration, and give rise to dioxins. Alternatively, polystyrene films are poorer in solvent resistance and thus demand those inks having special ingredients for printing. In addition, these polyvinyl chloride and polystyrene films have a problem that when used as a shrink label for PET containers (PET bottles and the like), they should be separated from the containers if the containers are to be recycled and reused.

Carrying no such problems, polyester films are highly expected as a shrink label replacing the polyvinyl chloride and polystyrene films, and the amount of their consumption is gradually increasing parallel to the expansion of the amount of PET containers used.

However, further improvement is still needed in the shrinkage properties of heat-shrinkable polyester films. In particular, as the films tend to cause shrinkage shading and crinkling when they are used for wrapping and shrink around containers such as PET, polyethylene, glass, and other bottles, the characters and drawings printed on the films before shrinkage are sometimes deformed after wrapping and shrink. Accordingly, there exists a need from users for reducing the deformation as much as possible. Additionally, the shrinkage stress of the films is generally smaller, and thus the films sometimes do not tightly bind to containers. Further, heat-shrinkable polyester films are sometimes smaller in shrinkage at lower temperature compared to heat-shrinkable polystyrene or other films, and accordingly demand higher temperature for shrinkage to the desired degree. However, shrinkage at high temperature is often accompanied with deformation and whitening of the bottles.

Incidentally, for wrapping bottles by heat-shrinkable films, the heat-shrinkable films are hitherto first printed (in printing step) and then processed into the shape suitable for loading onto the containers [such as labels (tubular labels), tubes, bags, and the like]. Subsequently, these processed films are loaded onto the bottles, which are transferred on conveyer belt through a heating tunnel (shrinkage tunnel), and the films are tightly bound to the containers by heat shrinkage. Steam tunnels, wherein the films are allowed to shrink by blowing steam, and hot-air tunnels, wherein the films are shrunk by blowing heated air, and the like are commonly used as the shrinkage tunnels.

The steam tunnels are generally better in heat transfer efficiency than the hot-air tunnels, and thus allow more uniform heat shrinkage of such labels and provide shrunk products better in appearance. However, even if the steam tunnel is employed, the heat-shrinkable polyester films are often not quite satisfactory from the viewpoint of product appearance property after heat shrinkage, compared to polyvinyl chloride and polystyrene films.

Further, the hot-air tunnel has a tendency to cause larger variation in temperature during heat shrinkage than the steam tunnel. Thus, when polyester films, lower in the product appearance property after heat shrinkage than polyvinyl chloride and polystyrene films, are heat-shrunk therein, the resulting films often have whitening due to shrinkage, shrinkage shading, crinkling, deformation, and the like, and especially a problem in appearance due to whitening.

In addition, there exists a need for further improving the processability and printability of the heat-shrinkable films. One of the methods to improve the processability and printability would be to make the films more uniform in thickness. Proper adjustment of the uniformity in film thickness can prevent crinkling and meandering of the films during production and thus improve the processability of films. It also prevents the films from partial lack of print during printing. Therefore, it is quite important to improve the uniformity in film thickness of the heat-shrinkable films.

A method of electrostatically bringing the melt-extruded film into tighter contact with a casting roll during the film being cooled by the roll has been known as the method for improving the uniformity in film thickness. In order to make the film securely contact with the roll electrostatically, it is important to provide a large number of electric charge carriers immediately after extrusion and before contact with the roll on the surface of the melt-extruded film. For the purpose of providing many electric charge carriers, it is effective to reduce the resistivity of the polyester by modifying the polyester, and indeed many efforts have been made for that purpose. For example, Japanese Examined Patent Publication No. 3-54129 disclosed that the addition of a magnesium compound, a sodium or potassium compound, and a phosphorus compound during production of polyethylene terephthalate (PET), at a Mg atom concentration of 30 to 400 ppm and a Na or K atom concentration of 3.0 to 50 ppm, and at an atomic number ratio of Mg to P (Mg/P) of 1.2 to 20, reduced the resistivity of PET films.

In this patent, the magnesium compound was added at the point when the degree of esterification is 20 to 80%; the sodium or potassium compound, before the intrinsic viscosity of the polyester reaching 0.2; and the phosphorus compound, after the point when the degree of esterification reaches 90% or more and before the point when the intrinsic viscosity reaches 0.2. The addition in that order suppressed generation of insoluble foreign materials and improved the quality of the films.

An object of the present invention is to provide a heat-shrinkable polyester film roll from which container-wrapping films reliable in processability and printability may be cut off in high yield.

SUMMARY OF INVENTION

Application of the method above developed for PET films (Japanese Examined Patent Publication No. 3-54129) to heat-shrinkable polyester films, i.e., addition of Mg and P to heat-shrinkable films may possibly improve the contact between the extruded film and the cooling roll and the uniformity in film thickness of the film, and consequently may be effective in improving the processability and printability of the resulting heat-shrinkable films.

However, PET and heat-shrinkable polyester films are considerably different from each other in raw materials used and property, and thus it is doubtful that the method developed for PET films is also effective for heat-shrinkable polyester films when applied as it is.

For example, heat-shrinkable polyester films (e.g., polyester films containing CHDM as a comonomer and the like) differ significantly from PET films in thermal properties (e.g., melting point, crystallization temperature, glass transition temperature, and the like) and are lower in heat resistance. Therefore, it is commonly believed that heat-shrinkable polyester films change their thermal properties significantly when an additive has added, decrease further in heat resistance, and tend to discolor and decrease in viscosity (decrease in molecular weight), and thus the addition of the additives such as Mg and P for reducing the melt resistivity is also likely to generate the same problems.

As a plurality of container-wrapping films are cut off from a long heat-shrinkable polyester film (film roll, or the like), it is important for the film to be of good processability and printability consistently over the entire length of the film. However, when produced according to the method disclosed in the Japanese Examined Patent Publication No. 3-54129, the film rolls often contain the regions poorer in uniformity of thickness and in processability and printability. Accordingly, there is a need for improving the yield of defect-free heat-shrinkable polyester films.

The heat-shrinkable polyester film rolls (a roll of a heat-shrinkable polyester film) according to the present invention are film rolls prepared by rolling heat-shrinkable polyester films. The film rolls are characterized in that:

(1) when square samples cut off in a size of 10 cm×10 cm are immersed in hot water at 85° C. for 10 seconds, subsequently in water at 25° C. for 10 seconds, and withdrawn, the heat shrinkage percentage of the samples in the maximum shrinkage direction is 20% or more;

(2) when the samples cut off from the film roll are measured at a temperature of 275° C., the melt resistivity (resistivity at melting state) thereof is $0.70 \times 10^8$ Ω·cm or less;

(3) when the termination end of rolling of the which is obtained from a steady region wherein physical properties of the film are stabilized in the film-running direction (longitudinal direction) is designated as end <A>, and the initiation end of rolling thereof as end <B>; the first cut-off point of sample is placed at a position 2 m or less inner from end <A> above, and the final cut-off point at a position 2 m or less inner from end <B> above, and additionally a plurality of sample cut-off points, at an interval of about 100 m from the first cut-off point; rectangular samples 20 cm in length in the maximum shrinkage direction of the film and 5 cm in width are cut off from the cut-off points; and the variations in thickness of respective samples in the maximum shrinkage direction are measured, the thickness distribution width of each sample represented by the following formula is 7% or less.

Thickness distribution width=(Maximum thickness−Minimum thickness)/average thickness×100

Such film rolls provide container-wrapping films excellent both in processability and printability in high yield.

If the maximum shrinkage direction of a film having a thickness distribution width of 7% or less is orthogonal to the film-running direction (longitudinal direction), when the termination end of rolling of the film which is obtained from the steady region wherein the film physical properties are stabilized in the film-running direction is designated as end <A>, and the initiation end of rolling thereof as end <B>; the first cut-off point of sample is placed at a position 2 m or less inner from end <A> above, and the final cut-off point at a position 2 m or less inner from end <B> above, and additionally a plurality of sample cut-off points at an interval of about 100 m from the first cut-off point; rectangular samples 20 cm in length in the film-running direction of the film and 5 cm in width are cut off from the cut-off points; and the variations in thickness of respective samples in the film-running direction are measured, the thickness distribution width of each sample represented by the above formula is preferably 10% or less. Reduction in the thickness distribution width in the film-running direction prevents the films from crinkling during they are printed or processed into a suitable shape by adhering the film using a solvent, for example, by a center seal automatic bag making machine. It also prevents fluctuation in film tension that may occur during the process for working the film after printing into a shape suitable for container wrapping, and thus prevents the partial lack of print and breakage of film.

The aforementioned films preferably contain an alkali-earth metal compound and a phosphorus compound at an alkali-earth metal atom $M^2$ content of 20 to 400 ppm (mass basis) and a phosphorus atom P content of 5 to 350 ppm (mass basis). Further, the mass ratio ($M^2$/P) of the alkali-earth metal atom $M^2$ to the phosphorus atom P is preferably 1.2 to 5.0. Additionally, the films above preferably contain, in addition to the alkali-earth metal and phosphorus compounds, an alkali metal compound, and the content of the alkali metal atom $M^1$ in film is preferably 0 to 100 ppm (mass basis). The addition of alkali-earth metal and phosphorus compounds to films reduces the melt resistivity and increases the uniformity in film thickness of the resulting films.

For production of such films, preferably are those processes that comprise a step wherein a molten polyester film extruded from an extruder is charged with electricity from an electrode, which is placed between the extruder and an electroconductive cooling roll, before being cooled by the cooling roll, and thus brought into tighter contact with the cooling roll. The electrode is preferably provided with a withdrawal device for withdrawing the stained surface of the electrode and a supplying device for supplying the fresh unstained surface of the electrode. Production of films in this manner prevents fluctuation in the thickness distribution width of film among the samples cut off from a plurality of cut-off points of the film rolls.

The heat-shrinkable polyester films are preferably films based on polyethylene terephthalate having, in addition to the polyvalent alcohol (polyol) component constituting the base unit (i.e. ethylene glycol component), a second alcohol component at a content of about 10 to 70 mole % with respect to the total amount of polyvalent alcohol components (100%). As the second alcohol component, often used is at lease one component selected from cyclic alcohol components (1,4-cyclohexane dimethanol and the like) and diol components having 3 to 6 carbons. The content of the 1,4-cyclohexane dimethanol component is preferably 5 mole % or more with respect to the total amount of polyvalent alcohols (100%). The use of the 1,4-cyclohexane dimethanol component allows further increase in heat shrinkage percentage, as it increases the amorphous nature of the film. Further, it also improves product appearance property after heat shrinkage.

The ratio of the 1,4-cyclohexane dimethanol component is more preferably 10 mole % or more (usually, 80 mole % or less) with respect to the total amount of polyvalent alcohol components (100%). Addition of the component at a ratio of 10 mole % or more drastically suppresses whitening due to shrinkage, and shrinkage shading.

When the termination end of rolling of the film which is obtained from the steady region wherein physical properties of the film are stabilized in the film-running direction (longitudinal direction) is designated as end <A>, and the initiation end of rolling thereof as end <B>; the first cut-off point of sample is placed at a position 2 m or less inner from the end <A> above, and the final cut-off point at a position 2 m or less inner from the end <B> above, and additionally a plurality of sample cut-off points at an interval of about 100 m from the first cut-off point; square samples in a size of 10 cm×10 cm are cut off from the cut-off points; the respective samples are immersed in hot water at 85° C. for 10 seconds, subsequently in water at 25° C. for 10 seconds, and withdrawn; and heat shrinkage percentage of respective samples in the maximum shrinkage direction is measured and the average is calculated, the measured values of the heat shrinkage percentage of each sample are preferably in the range of the average±3%. As described above, reduction in the fluctuation in heat shrinkage percentage of a heat-shrinkable film roll leads to decrease in fluctuation of the heat shrinkage of respective container-wrapping products (labels, bags, and the like), and consequently to drastic decrease in the defective fraction of the products.

The film rolls above preferably have an intrinsic viscosity of 0.66 dl/g or more. Higher intrinsic viscosity assures consistency in heat shrinkage stress of the resultant films, and prevents the disadvantages of whitening due to shrinkage, shrinkage shading, and the like. It is also effective in maintaining the mechanical strength and breaking resistance of the film rolls.

The films constituting the film rolls have usually a width of 200 mm or more and a length of 300 m or more.

In the present specification, the term "unstretched film" includes the film that is slightly stretched at the tension needed for feeding the film.

DETAILED DESCRIPTION

Figure 1:
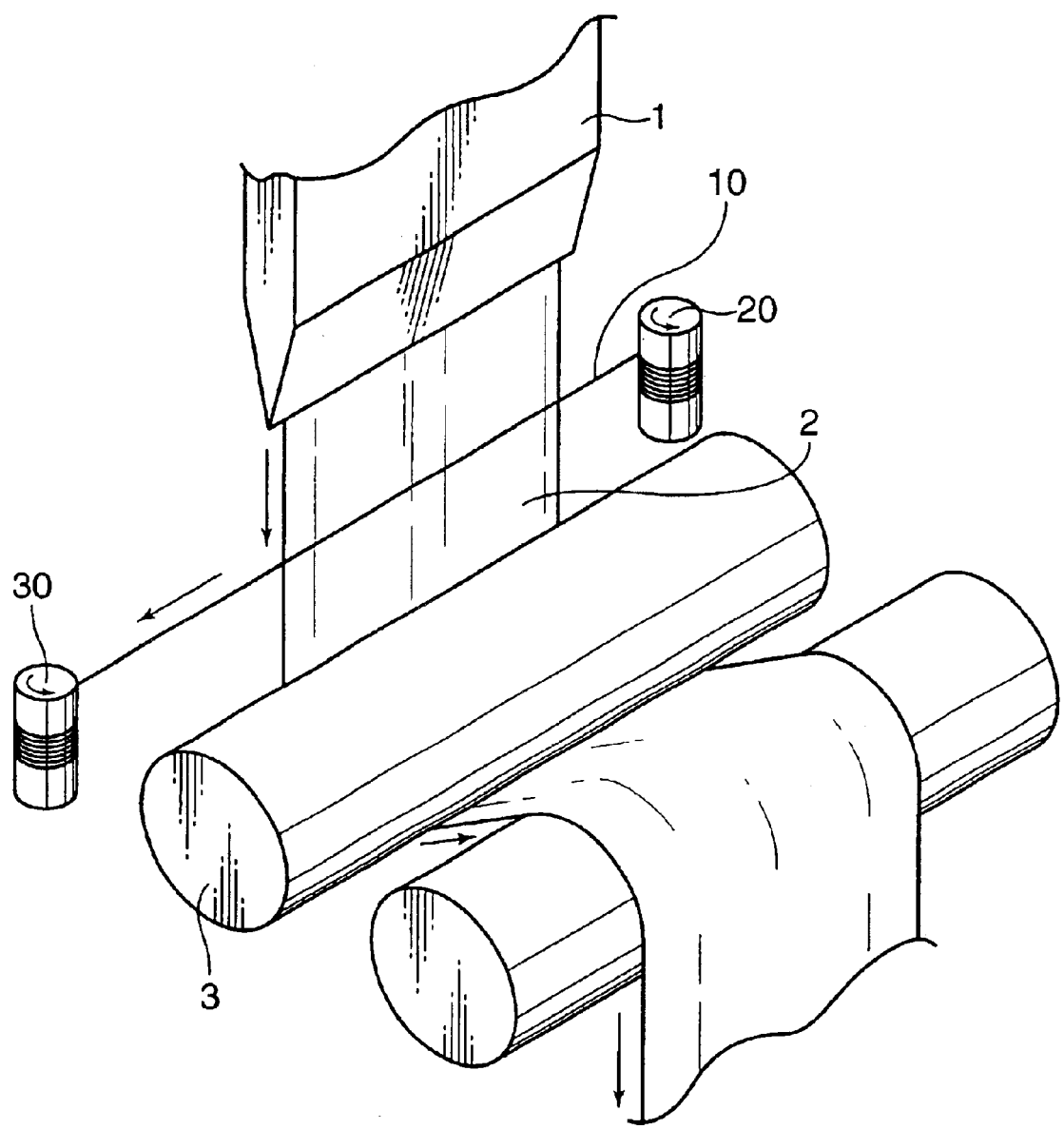
FIG. 1 shows a schematic perspective view illustrating an electrode used in the present invention.

Heat-shrinkable polyester film rolls are rolls of heat-shrinkable polyester films (hereinafter, occasionally referred to simply as films). The heat-shrinkable polyester films can be obtained roughly according to the following method.

(1) First, a polyester essentially consisting of dicarboxylic acid and polyvalent alcohol units is extruded in a molten state by an extruder and cooled by an electrically conductive cooling roll (casting roll or the like) into film (unstretched film).

During the extrusion, a copolyester may be extruded alone or a plurality of polyesters (copolyesters, homopolyesters, and the like) may be extruded together. Accordingly, the film contains a base unit (crystalline unit such as polyethylene terephthalate, etc.) as well as a second alcohol component different from the polyvalent alcohol component (ethylene glycol unit or the like) constituting the base unit.

(2) Secondly, the polyester film containing the second alcohol component is stretched to give a heat-shrinkable polyester film.

The stretching is preferably uniaxial, but may also be biaxial, i.e., the film may be additionally stretched in the direction different from the direction of uniaxial stretching (main direction). The stretching direction (main direction) is not particularly limited, and may be the film-running direction (longitudinal direction) or the direction orthogonal to the film-running direction (hereinafter, referred to as width direction). The main direction is preferably the width direction of film, from the viewpoint of production efficiency.

Rolls of the heat-shrinkable polyester films are useful in decorating (labeling) containers. The films are withdrawn from film rolls, printed, and cut into suitable shape for producing container-wrapping films. The container-wrapping films are then processed into the shape suitable for loading onto the containers [labels (tubular labels), tubes, bags], which are then loaded onto containers and bound tightly around the container by heating the film to shrink in a heat unit (steam tunnel, hot-air tunnel, or the like).

Hereinafter, the heat-shrinkable polyester film according to the present invention and the process of producing the same will be described in detail.

[Heat-Shrinkable Polyester Film]

[Heat Shrinkage Percentage]

The heat-shrinkable polyester films according to the present invention have a heat shrinkage percentage of 20% or more in the maximum shrinkage direction, when square samples cut off in a size of 10 cm×10 cm are immersed in hot water at 85° C. for 10 seconds, subsequently in water at 25° C. for 10 seconds, and withdrawn. The films having a heat shrinkage percentage of less than 20% are not favorable, as they often generate products defective in appearance due to insufficient heat shrinkage when loaded and shrunk around the containers or the like. The heat shrinkage percentage is more preferably 30% or more, furthermore preferably 40% or more. The upper limit of the heat shrinkage percentage is preferably 80% (more preferably, 75%).

The heat shrinkage percentage in the maximum shrinkage direction means a heat shrinkage percentage of a sample in the direction in which the shrinkage of the sample is greatest, and the maximum shrinkage direction is determined by comparing the lengths of the square sample in the vertical and horizontal (or crosswise) directions after shrinkage. The heat shrinkage percentage (%) is also a value determined by immersing a 10 cm×10 cm sample in hot water at 85° C.±0.5° C. for 10 seconds under no load inducing heat shrinkage; immediately thereafter in water at 25° C.±5° C. for 10 seconds; subsequently measuring lengths of the sample in the vertical and horizontal directions; and calculating according to the following formula:

Heat shrinkage percentage (%)=100×(Length before shrinkage–Length after shrinkage)/(Length before shrinkage)

The method for controlling the heat shrinkage percentage in the range above is not particularly limited, but include, for example, a method of extruding a polyester containing a second alcohol component at a suitable amount without stretching into a film shape, and stretching the unstretched film at a suitable magnification.

The second alcohol component described above may be either a diol component or a trivalent or higher-valent alcohol component. Examples of the diols constituting the diol components include alkylene glycols such as ethylene glycol, propylene glycol, 1,4-butanediol, neopentylglycol, 2,2-diethyl-1,3-propanediol, 1,6-hexanediol, 3-methyl-1,5-pentanediol, 2-methyl-1,5-pentanediol, 1,9-nonanediol, 1,10-decanediol, and the like; cyclic alcohols such as 1,4-cyclohexane dimethanol and the like; ether glycols such as diethylene glycol, triethylene glycol, polyethylene glycol, polypropylene glycol, polyoxytetramethylene glycol, alkylene oxide adducts of bisphenol compounds or the derivatives thereof; dimer diols; and the like. Examples of the trivalent or higher-valent alcohols include trimethylolpropane, glycerin, pentaerythritol, and the like.

The content of the second alcohol component is, for example, about 3 to 80 mole %, preferably about 5 to 75 mole %, more preferably about 10 to 70 mole %, still more preferably about 25 to 55 mole % with respect to the total amount of polyvalent alcohol components (100 mole %).

Preferred examples of the second alcohol components include cyclic alcohol components (1,4-cyclohexane dimethanol component); and diol components having about 3 to 6 carbons (propanediol component, butanediol component, hexanediol component, and the like).

The use of the cyclic alcohol component allows further increase in heat shrinkage percentage as it increases the amorphousness of the resulting film. It also increases product appearance property after heat shrinkage (i.e. suppression whitening due to shrinkage, shrinkage shading, crinkling, deformation, and/or uneven shrinkage in the direction orthogonal to the maximum shrinkage direction). The wrapping films cut off from the heat-shrinkable film rolls are often processed into the shape suitable for loading onto the containers [labels (tubular labels), tubes, bags, and the like] by adhesion using a solvent (tetrahydrofuran, 1,3-dioxolane, or the like). The use of the cyclic alcohol component (1,4-cyclohexane dimethanol component or the like) leads to increase in the solvent bonding property as well.

The ratio of the cyclic alcohol component is, for example, 5 mole % or more with respect to the total amount of polyvalent alcohol components (100%).

Incidentally, the heat-shrinkable polyester films, when heated to a certain temperature in the heat shrinkage step, reach saturation of the heat shrinkage percentage depending on the composition of the constituent polyesters, giving the polyester films that do not shrink even when heated to a temperature higher than the temperature. Such films have an advantage that they can heat-shrink at a relatively lower temperature, but often cause a shrinkage-whitening phenomenon, if the films are heat-shrunk in the hot-air tunnels or after stored for an extended period of time under an atmosphere of 30° C. or more. The shrinkage whitening phenomenon is likely to be the result of the local crystallization of polyester chains therein and the difference in refractive index between the crystal and amorphous regions.

However, the present inventors have found that the use of a cyclic alcohol component (1,4-cyclohexane dimethanol component or the like) in the amount of 10 mole % or more with respect to the total amount of polyvalent alcohols (100%) suppresses the shrinkage whitening drastically. In addition, it also suppresses shrinkage shading drastically.

The amount of the cyclic alcohol component (1,4-cyclohexane dimethanol component or the like) is preferably 12 mole % or more, more preferably 14 mole % or more.

The amount of the cyclic alcohol component is favorably controlled to be 80 mole % or less with respect to the total amount of polyvalent alcohol components (100%). The use of. the cyclic alcohol component in an excessive amount may lead to excessive increase in shrinkage percentage of the resulting films, and thus to displacement of the labels and deformation of printed drawings in the heat shrinkage step. Additionally, it may also lead to decrease in the films' solvent resistance, which in turn leads to whitening of the films due to the solvent (ethyl acetate or the like) used in ink in the printing step, or decrease in the breaking resistance of the resulting films. Thus the use of an excessive amount of cyclic alcohol component is unfavorable. Consequently, the amount of the 1,4-cyclohexane dimethanol component is more preferably 70 mole % or less, still more preferably 60 mole % or less, and particularly preferably 30 mole % or less (e.g., 25 mole % or less).

On the other hand, the use of a diol having about 3 to 6 carbons ($C_{3-6}$ diol) reduces the glass transition temperature (Tg) of the resulting polyester films and thus improves the low temperature shrinkage property of the films. The use of a $C_{3-6}$ diol allows control of the glass transition temperature (Tg) of the films, for example, to about 60 to 75° C.

The content of the $C_{3-6}$ diol component is for example about 2 to 40 mole %, preferably about 3 to 35 mole %, more preferably about 5 to 30 mole %, still more preferably 7 to 25 mole %, with respect to the total amount of polyvalent alcohol components (100%).

The cyclic alcohol (1,4-cyclohexane dimethanol or the like) and the $C_{3-6}$ diol are preferably used together. When used together, the total amount of the cyclic alcohol and $C_{3-6}$ diol components is for example about 10 to 80 mole %, preferably about 15 to 70 mole %, more preferably about 20 to 60 mole %, still more preferably about 25 to 50 mole % with respect to the total amount of polyvalent alcohol components (100%). The content of the $C_{3-6}$ diol component is for example about 2.5 to 150 mole, preferably about 4 to 120 mole, more preferably about 7 to 100 mole with respect to the total amount of the cyclic alcohol components (100 mole).

As described above, polyvalent alcohol components other than the second alcohol component are alcohol components (ethylene glycol and the like) constituting the crystalline units (ethylene terephthalate unit and the like). Increase in the amount of the alcohol components for the crystalline units leads to increase in breaking resistance, strength, heat resistance, and the like of the resulting films. For that purpose, the amount of the alcohol components for crystalline units is, for example, 20 mole % or more, preferably 30 mole % or more, more preferably 40 mole % or more, still more preferably 50 mole % or more with respect to the total amount of polyvalent alcohol components (100%).

On the other hand, dicarboxylic acids (terephthalic acid, ester derivatives thereof, and the like) that can form the base unit (crystalline unit) as well as various other dicarboxylic acids may be used as the dicarboxylic acids constituting the dicarboxylic acid components of the film, and examples of these dicarboxylic acids include various aromatic dicarboxylic acids; the ester derivatives thereof; and various aliphatic dicarboxylic acids; and the like. Examples of the aromatic dicarboxylic acids include, as well as terephthalic acid described above, isophthalic acid, naphthalene-1,4- or -2,6-dicarboxylic acid, 5-sodium sulfoisophthalate, and the like. The ester derivatives include derivatives such as dialkylesters, diarylesters, and the like. Examples of the aliphatic dicarboxylic acids include dimer acid, glutaric acid, adipic acid, sebacic acid, azelaic acid, oxalic acid, succinic acid, and the like.

The stretching ratio of films (stretching ratio in the main direction) may be selected suitably according to the kind and content of the second alcohol component, and is for example about 3.0 to 5.5, preferably about 3.2 to 5.4, more preferably about 3.4 to 5.3. In addition, when the second alcohol component is a cyclic alcohol component (1,4-cyclohexane dimethanol component), a $C_{3-6}$ diol component, or a combination of these components, the stretching ratio is for example about 2.3 to 7.3, preferably about 2.5 to 6.0.

[Melt Resistivity]

The heat-shrinkable polyester films according to the present invention have a melt resistivity of $0.70 \times 10^8$ Ω·cm or less at a temperature of 275° C. As will be described in detail below, the use of such films allows increase in the uniformity of film thickness, and thus improve the printability of the films and the processability during conversion of the films into the shape suitable for loading onto the containers (processability).

In the present invention, a molten polyester film extruded from an extruder is charged with electricity from an electrode, which is placed between the extruder and an electroconductive cooling roll, by impressing voltage between the casting roll and the electrode, before being cooled by the cooling roll (casting roll or the like), and thus brought into tighter contact with the cooling roll. Lower melt resistivity leads to better contact between the film and the roll. When the electrostatic contact with the cooling roll is inadequate, the cast unstretched films tend to have rather uneven thickness distribution, and the stretched films from the same unstretched films have an even greater nonuniformity in thickness distribution. Adversely when the electrostatic contact is sufficiently tight, the stretched films also have more uniform thickness distribution.

Films having higher uniformity in film thickness prevent the problem of discrepancy of colors when they are subjected to polychromic printing, wherein a plurality of color are coated repeatedly, and thus improve printability.

Additionally, films having higher uniformity in film thickness permit easier overlapping of the bonding portions of the films when the films are processed into tubes or the like by solvent bonding. Those films also prevent crinkling and meandering during polychromic printing of the films and consequently increase the processability of the films.

Further, films having higher uniformity in film thickness prevents generation of the local difference in rolling strength when the films are rolled, generation of looseness and crinkling in the films, and deterioration of film appearance.

The increase in electrostatic contact due to decrease in melt resistivity improves not only the uniformity in film thickness but also the appearance and productivity of the film. Namely, the tighter electrostatic contact improves the stability in cooling and solidifying films, resulting in increase in the casting speed (production speed). In addition, tighter electrostatic contact prevents inadequate cooling and solidification of the films, which often results in local entering of air between the film and the roll and generation of bubble-like defects (i.e. bubble like defects due to pin (push) the film against the roll; filamentary defects) on the film surface, and consequently provides films better in appearance.

The melt resistivity is preferably $0.65 \times 10^8$ Ω·cm or less, more preferably $0.60 \times 10^8$ Ω·cm or less, still more preferably $0.3 \times 10^8$ Ω·cm or less.

In order to control the melt resistivity in the range above, it is desirable to add both an alkali-earth metal compound and a phosphorus-containing compound to the films. Even though the presence of an alkali-earth metal compound alone is effective in reducing the melt resistivity, the presence of the phosphorus-containing compound together with the alkali-earth metal compound allows drastic reduction in melt resistivity. Though it is not clear why the combined use of the alkali-earth metal and the phosphorus-containing compounds is so effective in reducing the melt resistivity, it is likely that the presence of the phosphorus-containing compound leads to reduction in the amount of foreign materials and increase in the amount of electric charge carriers.

The content of the alkali-earth metal compound in film is for example 20 ppm (mass basis) or more, preferably 40 ppm (mass basis) or more, more preferably 50 ppm (mass basis) or more, still more 60 ppm (mass basis) or more, as the alkali-earth metal atom $M^2$. The presence of the alkali-earth metal compound in a smaller amount does not allow reduction in melt resistivity. Alternatively, the presence of the alkali-earth metal compound in an excessive amount leads to saturation in the advantageous effect of reducing the melt resistivity and rather to disadvantageous effects such as generation of foreign materials, discoloration, and the like. Therefore, the content of the alkali-earth metal compound is for example 400 ppm (mass basis) or less, preferably 350 ppm (mass basis) or less, more preferably 300 ppm (mass basis) or less, still more preferably about 160 ppm (mass basis) or less, as the alkali-earth metal atom, $M^2$.

The content of the phosphorus compound in film is for example 5 ppm (mass basis) or more, preferably 20 ppm (mass basis) or more, more preferably 40 ppm (mass basis) or more, still more preferably 60 ppm (mass basis) or more as phosphorus atom P. The presence of the phosphorus compound in the amount smaller does not allow reduction in melt resistivity and also in the amount of foreign materials generated. On the contrary, the presence of an excessive amount of the phosphorus compound leads to saturation in the advantageous effect of reducing the melt resistivity. Further, it also promotes generation of diethylene glycol. As it is difficult to control the amount thereof generated, it may provide films having physical properties different from those expected. Accordingly, the content of the phosphorus compound is for example 500 ppm (mass basis) or less, preferably 450 ppm (mass basis) or less, more preferably 400 ppm (mass basis) or less, particularly preferably 350 ppm (mass basis) or less [e.g., 100 ppm (mass basis) or less] as phosphorus atom, P.

When both an alkali-earth metal compound and a phosphorus compound are used for reducing the melt resistivity of the films, the mass ratio ($M^2/P$) of the alkali-earth metal atom, $M^2$, to phosphorus atom, P, in the films is favorably 1.2 or more (preferably 1.3 or more, more preferably 1.4 or more, particularly preferably 1.6 or more). The addition of these compounds at a mass ratio ($M^2/P$) of 1.2 or more allows significant reduction in melt resistivity of the resulting films. Contrary, the addition of these compounds at a mass ratio ($M^2/P$) of over 5.0 leads to increase in the amount of foreign materials generated and in discoloration of the resulting films. Therefore, the mass ratio ($M^2/P$) is 5.0 or less, preferably 4.5 or less, more preferably 4.0 or less, particularly preferably 3.0 or less.

It is desirable to add an alkali metal compound in addition to the alkali-earth metal and phosphorus-containing compounds to the films in order to reduce the melt resistivity even more. The alkali metal compound cannot reduce the melt resistivity when added alone to the films, but can reduce significantly the melt resistivity when added to the films together with an alkali-earth metal compound and a phosphorus-containing compound. Although the reason is not clear, the alkali metal, alkali-earth metal, and phosphorus-containing compounds seem to form a complex and thus reduce the melt resistivity.

The content of the alkali metal compound in the films is for example 0 ppm (mass basis) or more, preferably 5 ppm (mass basis) or more, more preferably 6 ppm (mass basis) or more, particularly preferably 7 ppm (mass basis) or more, as the alkali metal atom $M^1$. Presence of an excessive amount of the alkali metal compound leads to saturation of the advantageous effect of reducing the melt resistivity and to increase in the amount of foreign materials generated. Therefore, the content of the alkali metal compound is for example 100 ppm (mass basis) or less, preferably 90 ppm (mass basis) or less, more preferably 80 ppm (mass basis) or less, particularly preferably 30 ppm (mass basis) or less as the alkali metal atom $M^1$.

Examples of the alkali-earth metal compound include hydroxides, alkoxides, aliphatic carboxylates (acetate, butyrate, etc., preferably acetate), aromatic carboxylates (benzoate), salts of compounds having phenolic hydroxyl groups (salts of phenol and the like), and the like of alkali-earth metals. The alkali-earth metals include magnesium, calcium, strontium, barium, and the like (preferably magnesium). Preferred examples of the alkali-earth metal compounds include magnesium hydroxide, magnesium methoxide, magnesium acetate, calcium acetate, strontium acetate, barium acetate, and the like, particularly magnesium acetate. The alkali-earth metal compounds may be used alone or in combination of two or more.

Examples of the phosphorus compounds include phosphoric acids (phosphoric acid, phosphorous acid, hypophosphorous acid, and the like) and the esters thereof (alkylesters, arylesters, and the like); and alkylphosphonic acids, arylphosphonic acids and the esters thereof (alkylesters, arylesters, and the like). Preferred examples of the phosphorus compounds include phosphoric acid; phosphoric acid aliphatic esters (phosphoric acid alkylesters; e.g., phosphoric acid mono $C_{1-6}$ alkylesters such as phosphoric acid monomethylester, phosphoric acid monoethylester, phosphoric acid monobutylester, and the like; phosphoric acid di $C_{1-6}$ alkylesters such as phosphoric acid dimethylester, phosphoric acid diethylester, phosphoric acid dibutylester, and the like; phosphoric acid tri $C_{1-6}$ alkylesters such as phosphoric acid trimethylester, phosphoric acid triethylester, phosphoric acid tributylester, and the like); phosphoric acid aromatic ester (phosphoric acid mono-, di- or tri- $C_{6-9}$ aryl esters such as phosphoric acid triphenyl, phosphoric acid tricresyl, and the like); phosphorous acid aliphataic esters (phosphorous acid alkylesters; e.g., phosphorous acid mono-, di- or tri-$C_{1-6}$ alkylesters such as phosphorous acid trimethyl, phosphorous acid tributyl, and the like); alkyl phosphonic acids ($C_{1-6}$ alkylphosphonic acids such as methylphosphonic acid, ethylphosphonic acid, and the like); alkylphosphonic acid alkylesters ($C_{1-6}$ alkylphosphonic acid mono- or di-$C_{1-6}$ alkylesters such as methylphosphonic acid dimethyl, ethylphosphonic acid dimethyl, and the like); arylphosphonic acid alkylesters ($C_{6-9}$ arylphosphonic acid mono- or di-$C_{1-6}$ alkylesters such as phenylphosphonic acid dimethyl, phenylphosphonic acid diethyl, and the like); and arylphosphonic acid arylesters ($C_{6-9}$ arylphosphonic acid mono- or di-$C_{6-9}$ arylesters such as phenylphosphonic acid diphenyl, and the like). Particularly preferable examples of the phosphorus compounds include phosphoric acid, phosphoric acid trialkyls (phosphoric acid trimethyl, and the like). These phosphorus compounds may be used alone or in combination of two or more.

Examples of the alkali metal compounds include hydroxides, carbonates, aliphatic carboxylates (acetates, butyrates and the like, preferably acetates), aromatic carboxylates (benzoates), and salts of the compounds having phenolic hydroxyl groups (salts of phenol, and the like) of alkali metals. The alkali metals include lithium, sodium, potassium, and the like (preferably sodium). Preferred examples of the alkali metal compounds include lithium hydroxide, sodium hydroxide, potassium hydroxide, lithium carbonate, sodium carbonate, potassium carbonate, lithium acetate, sodium acetate, potassium acetate, and the like, particularly sodium acetate.

[Thickness Distribution in the Maximum Shrinkage Direction]

The reduction in melt resistivity and thus the increase in the uniformity of film thickness as described above are not enough to be completely satisfactory. When films are rolled, the films are much longer in length (e.g., about 300 m to 6000 m) and thus may have some local points poorer in the uniformity of thickness.

However, the film rolls according to the present invention have a higher level of uniformity in film thickness in the film-running direction thereof. Thus, the film rolls according to the present invention provide, in high yield, container-wrapping films, which are cut off from the film rolls.

As multiple pieces of the same container-wrapping products (end-products such as labels, bags, and the like) are usually produced from a single heat-shrinkable film roll, the difference in thickness at various points may lead to larger variation in thickness of container-wrapping product unit and in the stiffness of the films when loaded on containers, resulting in increase in the defective fraction of the final products due to improper loading of the container-wrapping products. The films according to the present invention provide samples from various cut-off points excellent in uniformity, allowing reduction in defective fraction and increase in yield of the products.

The film thickness needs not be uniformized at a high level over the entire region of the heat-shrinkable film in the film roll, but may be controlled at a high level at least in the steady region, where the physical properties of the film is stabilized in the film-running direction. It is because although all heat-shrinkable films are produced by extruding and casting plastics in a molten state and stretching the resultant films in the same manner, the physical properties of the stretched films vary significantly when produced during the period before the casting and stretching processes are stabilized (before the steady state is reached). Even after the casting and stretching processes reach a steady state, the physical properties of films vary significantly according to the change in casting and stretching condition. The present invention is not intended to uniformize the thickness of films produced during the period before the casting and stretching processes reach a steady state, but to uniformize the thickness of films produced in a steady state of the casting and stretching processes, at a level higher than that in the convention processes.

The number of the steady state regions (steady operations) is not particularly limited and may be one per film roll (including the case where the entire film roll is produced in a steady state) or two or more. The steady state region may be determined for example by measuring the heat shrinkage percentage of films. In the steady region, the heat shrinkage percentage is stable within the range of, for example, about 20% or less (i.e., the difference between the maximum and minimum values of the heat shrinkage percentage is about 20% or less), preferably about 16%.

The uniformity of film thickness in the steady region can be determined by measuring the film thickness of the samples cut off from the following sites:

when the termination end of rolling of the film which is obtained from the steady region is designated as end <A>, and the initiation end of rolling thereof as end <B>; the first cut-off point of sample placed at a position 2 m or less inner from end <A> above, the final cut-off point placed at a position 2 m or less inner from end <B> above, and additionally a plurality of sample cut-off points placed at an interval of about loom from the first cut-off point. The phrase, "at an interval of about 100 m", means that the samples may be cut off at an interval of 100 m±about 1 m (hereinafter, the phrase indicates the same).

The uniformity in thickness can be evaluated by the thickness distribution width calculated by the following formula.

Thickness distribution width=(Maximum thickness−Minimum thickness)/Average thickness×100

The maximum, minimum, and average thickness can be determined by measuring the variation in film thickness in the maximum shrinkage direction using a contact thickness gauge, of the samples 20 cm in length (in the maximum shrinkage direction) and 5 cm in width cut off from the roll.

The film rolls according to the present invention, when the variation in thickness of the sample cut off from each cut-off point is measured in the maximum shrinkage direction, have a thickness distribution width calculated by the former formula, of 7% or less, preferably 6% or less, more preferably 5% or less, particularly preferably 4% or less.

In order to keep the thickness distribution width of the samples from all cut off points in the range described above, it is not sufficient to keep the casting and stretching processes in a steady state, and additionally it is also necessary to stabilize the electrostatic contact of the film to the cooling roll during the molten polyester is extruded and cooled, over the period from initiation to termination of the film production. Accordingly, in the present invention, an electrode provided with a withdrawal device for withdrawing the stained surface, thereof and a supply device for supplying a clean surface thereof is used as the electrode used in the step for cooling the molten resin. Namely, when the molten polyester film is electrostatically brought into contact with the cooling roll by applying electricity from the electrode during casting, as the polyester often contains multiple kinds of polymers (homopolymers, copolymers, and the like), monomers, and additionally several low-molecular weight components, the low-molecular weight components volatilize, gradually staining the electrode during the melt-extrusion. Accordingly, as the films are produced continuously, the staining of electrode progresses, finally to the point that the electrode cannot provide sufficient electricity to the film any more and the film cannot be brought into contact with the cooling roll electrostatically. However in the present invention, the adoption of the particular electrode above, which replaces the stained electrode surface with a non-stained surface, enables to keep the surface of the electrode fresh and fewer in staining. Therefore, even when film production is continued for an extended period of time, the electrostatic contact is always controlled at a certain high level, and accordingly the samples collected at various cut-off points consistently have the predetermined thickness distribution described above.

Figure 2:
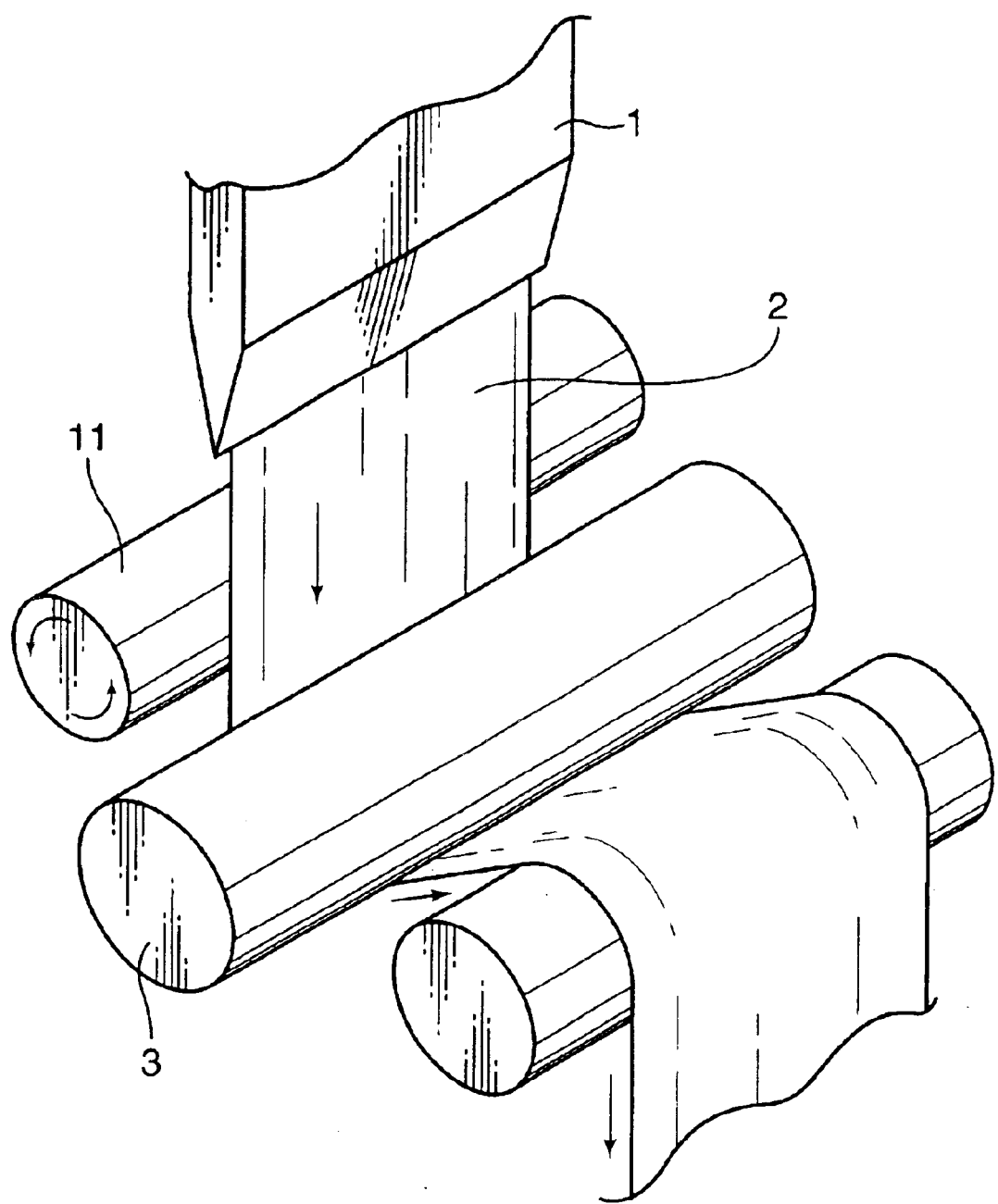
FIG. 2 shows a schematic perspective view illustrating another electrode used in the present invention.
Figure 3:
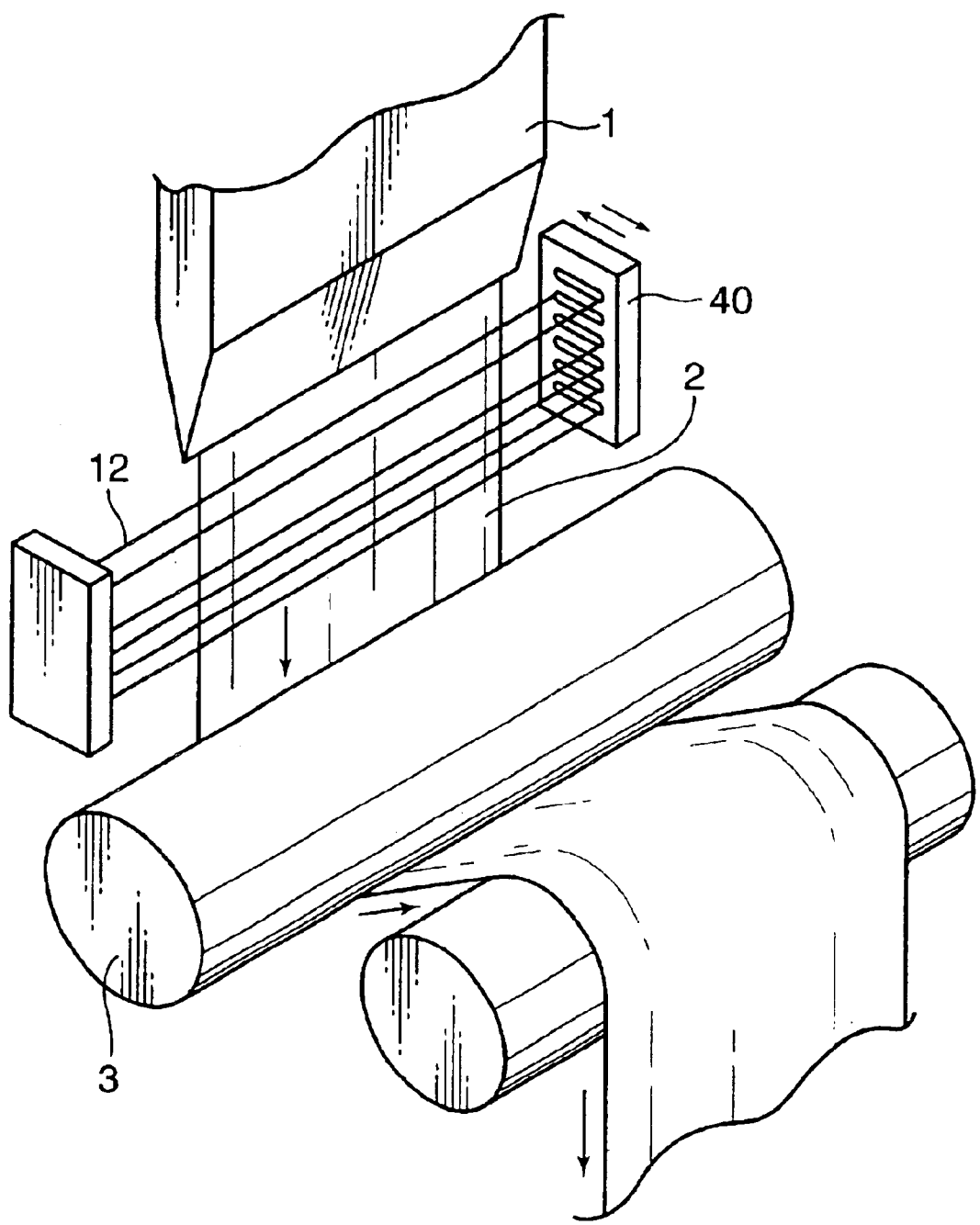
FIG. 3 shows a schematic perspective view illustrating yet another electrode used in the present invention.

The particular electrodes are, for example, those shown in FIGS. 1 to 3. In the examples in FIGS. 1 to 3, film 2 is melt-extruded from die 1 connected to an extruder and cooled by electrically conductive cooling roll 3 to give a solid film.

(1) In the example of FIG. 1, wire electrode 10 facing the surface of film 2 is placed between the extruder (die 1) and electrically conductive cooling roll 3. Wire electrode 10 is placed close to film 2, and the distance between film 2 and the wire electrode is about 5 to 20 mm (the distance between the film and the electrode described below is also the same), allowing the electrode to provide static electricity to film 2. One end of wire electrode 10 is connected to an almost cylindrical wire delivery device (supply device) 20, around which wire electrode 10 is wound, while another end of wire electrode 10 is connected to an another almost cylindrical wire storing device (withdrawal device) 30 for withdrawing wire electrode 10. The rotation of the wire supply device in the direction to supply the wire and simultaneously of the withdrawal device in the direction to withdraw the wire allows withdrawal of the wire portion polluted by the sublimates from the film and supplying wire electrode 10 fresh and smaller in the amount of stains.

(2) In the example of FIG. 2, a cylindrical electrode 11 is placed between die 1 and electrically conductive cooling roll 3, and the axis of electrode 11 is arranged in a direction parallel to the face of film 2. Electrode 11 has a periphery surface located almost linearly close to the face of film 2 and can charge static electricity to film 2. Cylindrical electrode 11 is connected to a rotating device not shown in the figure such as a motor or the like (in such a case, the rotating device has the roles of the supply and withdrawal devices above), and the rotation (autorotation) of cylindrical electrode 11 by the rotating device keeps the surface of electrode 11 close to film 2 fresh and fewer in stains.

(3) In the example of FIG. 3, a plurality of electrode units (wire electrode units, brush electrode units, and the like; shown in the figure are wire electrode units) 12 are place between die 1 and electrically conductive cooling roll 3.

All electrode units 12 are connected to an electrode-supporting box 40, which has the roles of delivering device (supply device) for delivering each electrode unit 12 independently close to the film and of separating device (withdrawal device) for separating each electrode unit 12 independently from the film. The delivery of each electrode unit 12 one by one close to film 2 allows keeping electrode unit 12 fresh and fewer in stains so that it can charge static electricity to film 2, and prevents reduction in the electrostatic contact property.

When either electrode 10 or 11 in the example of (1) or (2) is employed, the delivery of wire electrode 10 from supply device 20 and the rotation of cylindrical electrode 11 by the rotating device may be conducted continuously or intermittently, preferably continuously.

The material for the electrode is not particularly limited, but the use of a tungsten electrode is favorable from the viewpoint of the stability of the electrostatic contact and the strength of the electrodes.

When a wire electrode is employed, the diameter of the wire is preferably in the range of about 0.15 to 0.35 mm, from the viewpoint of the stability of electrostatic contact and strength of electrodes.

On the other hand, the cooling roll has electrically conductivity and is not further particularly limited, but the surface thereof is preferably coated with a metal, especially chrome-plated. In addition, the surface temperature of the cooling roll is preferably kept in the range of 25 to 50° C.

From the viewpoint of the stability of electrostatic contact, the applied voltage is preferably for example 6.5 kV or more, preferably 7.5 kV or more, more preferably 8.5 kV or more, and usually 10 kV or less.

The electric current is for example 3.0 mA or more, preferably 3.5 mA or more, more preferably 4.0 mA or more, and is usually 5.0 mA or less.

In order to make all samples from various cut-off points have a thickness distribution width in the specific range described above, it is desirable to adopt methods for: (A) uniformizing raw polyesters during film production; (B) stabilizing the casting process; and (C) stabilizing the process for stretching the film; in addition to the method above for stabilizing the electrostatic contact over the entire film production processes from initial to end. These methods of (A) uniformizing raw materials, (B) stabilizing the casting process, and (C) stabilizing the stretching process may be adopted alone or in combination of two or more (especially all). Favorable is the method of (A) uniformizing the raw materials.

(A) Method of Uniformizing the Raw Polyesters During Film Production

As described above, a plurality of raw polyesters, different in composition, are mixed (blended) for production of polyester films in the present invention. The following two methods, (1) and (2), are typically used for mixing and extrusion: (1) A plurality of polyesters (polyester chips) different in composition are supplied respectively into a plurality of hopper for storing polyesters continuously or intermittently, and then are supplied, via a buffering hopper as needed, finally to a hopper (final hopper) immediately before or above an extruder. (2) The polyester chips are blended in the final hopper, supplied quantitatively into the extruder at the rate corresponding to the amount of extrusion, and cast into a film.

The present inventors have found that a phenomenon of segregation of raw materials (mal-distribution of raw materials) can occur depending on the shape of the hopper, i.e., the composition of the blended chips supplied from the final hopper into the extruder vary significantly between the cases when the residual amount of the chips left over in the final hopper is large and when it is small. The phenomenon is encountered more frequently when the capacity or the shape of the final hopper is inadequate, and most frequently when the shape and relative density of various polyester chips differ significantly form each other. Consequently, the amount of the alkali-earth metal and phosphorus compounds added for improving the electrostatic contact property fluctuates during the course of film production, possibly resulting in increase in the thickness distribution width.

In order to obtain films having lower variation in the content of the alkali-earth metal and phosphorus compounds, methods for suppressing the segregation of raw materials (mal-distribution of raw materials) in the final hopper, for example, methods of: (i) adjusting the shape of each polyester chip; (ii) reducing the amount of powdery polyester chips; (iii) optimizing the shape of the final hopper; (iv) optimizing the capacity of the final hopper; and the like may be employed.

(i) Method of Adjusting the Shape of Each Polyester Chip

Adjustment of the shape of each polyester chip allows reduction in the segregation of raw materials described above. When there is a large difference in the size of chips, smaller chips tend to sink during the chips being moved downward in the final hopper, making the proportion of the larger chips higher when the content in the final hopper becomes smaller, thus resulting in the segregation of raw materials. In contrast, standardization of the shape and size of polyester chips allows reduction in the segregation of raw materials, as it prevents the amount of smaller chips that move faster.

The polyesters are generally withdrawn in a molten state in the form of strand from the polymerization equipment, immediately cooled with water, and cut into chips. Accordingly, the polyester chips usually are cylindrical in shape and have an elliptic cross section. Therefore, for standardization of the shape and size of polyester chips, the average major diameter (mm) and average minor diameter (mm) of the elliptic cross section of each polyester chip, and the average chip length (mm) thereof are desirably standardized.

In the case when a polyester chip is added to another polyester chip used in the greatest amount in a film (major polyester chip), it is desirable to use a polyester chip having an average major diameter (mm) and an average minor diameter (mm) of the elliptic cross section and an average chip length (mm) respectively in the range of ±20%, preferably ±15% of those of the major polyester chip. The combination of the polyester chip and the major polyester chip is not particularly limited, but the use of a copolyester chip as the major polyester chip and a homopolyester chip (polyethylene terephthalate chip, polybutylene terephthalate chip, or the like) as another polyester chip is preferable.

(ii) Method of Reducing the Amount of Powdery Polyester Chips

Powders (powdery polyester chips) generated by mutual grinding or the like of raw chips promote the segregation of raw materials. Thus, reduction in the amount of powders also helps to reduce the segregation of raw materials.

The amount of powders in polyester chips is preferably controlled in the range of 1 mass % or less, more preferably 0.5 mass % or less, in all steps until the raw chips enter into the extruder.

The method of reducing the amount of powders include for example a method to reduce the amount of powders generated in the production processes (by classification or the like). Specifically, the fine powders can be removed, for example, by way of sieving the chips chopped in the strand cutter and/or by way of air conveying the raw chips via a cyclone air filter.

(iii) Method of Optimizing the Shape of the Final Hopper

An example of the method is to use a funnel-shaped hopper and to make the inclined wall (side wall) thereof as steep as possible.

When the inclined wall (side wall) is almost vertical, larger and smaller chips alike move downward in the similar manner, and the upper edge of the content moves downward consistently keeping the surface horizontal. Accordingly, vertical wall is effective in reducing the segregation of raw materials. The inclination angle of the inclined wall (side wall) is for example 65° or more, preferably 70° or more.

The inclination angle of the inclined wall (side wall) is an angle between the inclined wall (side wall) of the funnel-like hopper and horizontal line (horizontal plane). If a plurality of hoppers (hoppers supplying respective chips and the like) are installed upstream of the final hopper, these hoppers too preferably have an inclination angle of 65° or more, preferably 70° or more.

(iv) Method of Optimizing the Capacity of the Final Hopper Supply of the chips blended in the final hopper to the extruder over an extended period of time sometimes causes segregation (mal-distribution) of the blended chips during the supply.

Therefore, shortening the dwell time of blended chips in the hopper, i.e., contraction of the capacity of the hopper so that the blended chips may be discharged in a relatively short period, can suppress the segregation of raw materials.

The optimal capacity of the hopper is for example in the range of 15 to 120 mass % of the discharge amount from an extruder per hour, preferably in the range of 20 to 100 mass %, particularly preferably in the range of 25 to 40 mass %.

When two or more polyester chips different in composition are blended, it is most preferable that these chips are continuously blended in the (final) hopper immediately above the extruder and quantitatively supplied into the extruder. Alternatively, the raw chips that are controlled in chip size in the range described above may be blended in advance and then supplied via intermediate (buffer) hoppers, to the final hopper and the extruder. A plurality of raw chips may be blended in a hopper by quantitatively supplying a plurality of raw materials thereto from equipments that allow quantitative supply of the raw chips, or may be premixed for example by the use of a blender or the like. In the latter case, it is favorable to pay attention to the size of the raw chips so that the segregation of the mixture may not happen during discharge.

Though one of the methods above, i.e., (i) adjustment of the chip shape, (ii) reduction in the amount of powdery chips, (iii) optimization of the hopper shape, and (iv) optimization of the hopper capacity, may be used alone, but it is more preferable to use two or more methods combined, most preferable to use all four methods together.

(B) Method for Stabilizing the Casting Process

The methods for stabilizing the casting process include those for suppressing the fluctuation in discharge rate from the extruder, for suppressing the fluctuation in rotational velocity of the cooling roll (casting roll, or the like), and the like.

In suppressing the fluctuation in discharge rate, the discharge rate is preferably controlled in the range of, for example, the average discharge rate±2%. In suppression of the fluctuation in discharge rate, it is preferable to use, for example, a gear pump as an extruding means.

In suppression of the fluctuation in rotational velocity, the rotational velocity is preferably controlled in the range of, for example, the average rotational velocity±2%. In suppression of the fluctuation in rotational velocity, it is preferable to use, for example, a roll drive-type device for controlling the rotational velocity, e.g., an inverter for controlling the rotational velocity.

(C) Method of Stabilizing the Film Stretching Process

In order to provide the film with heat-shrinkability, unstretched films should be stretched. For stabilizing the film stretching process, various improvements for stabilization are directed to the common stretching method.

In the common stretching method, the timing of stretching is not particularly limited. For example, the unstretched film obtained after cooling by the cooling roll (casting roll or the like) may be once rolled to the form of roll and then stretched by withdrawing the film form the roll, or may be stretched directly and continuously after cooling, without rolling to the form of roll.

Although the stretching direction (maximum shrinkage direction of the film) may be either the traverse (width) direction or length direction (film-running direction) of the film, it is more practical to stretch the film in the traverse (width) direction of the film from the viewpoint of production efficiency. Accordingly, the method of stretching films when the stretching direction (maximum shrinkage direction) is identical with the traverse direction will be described below. When the stretching direction (maximum shrinkage direction of the film) is the length (longitudinal) direction of the film, such films may be produced according to the normal operation, just by changing the stretching direction for 90° from that in the method described below.

Conventional stretching means such as tenter and the like may be used for stretching films in the traverse direction.

The stretching ratio is in the range described in the section of [Heat shrinkage percentage] above, (e.g., about 2.3 to 7.3, preferably about 2.5 to 6.0).

When the films are stretched in the traverse direction, the films are not necessarily stretched only in the traverse direction by, for example, tenter (uniaxial stretching), but may be stretched both in the traverse and film-running directions (biaxial stretching). The stretching ratio in the film-running direction is smaller than that in the traverse direction, and for example, about 1.0 to 4.0, preferably about 1.1 to 2.0. It is undesirable to have a too large stretching ratio in the film-running direction, as the resulting films have an excessively high heat shrinkage percentage in the direction orthogonal to the maximum shrinkage direction (e.g., over 10%), when measure according to the method for measuring the heat shrinkage percentage above. The timing of the biaxial stretching is not particularly limited, and the stretching may be, for example, sequential or simultaneous biaxial stretching, and further an additional restretching may be also carried out if needed. In the sequential biaxial stretching, the order of stretching is also not particularly limited, and thus any stretching in the directions of film-running and then traverse; traverse and then film-running; film-running, traverse and film-running; traverse, film-running and traverse; and the like, may be employed.

After stretching, the films are preferably heat-treated at a predetermined temperature in the range of 50° C. to 110° C. while stretching the films for 0 to 15% or relaxing the films for 0 to 15%, and further at a predetermined temperature in the range of 40° C. to 100° C. if needed.

The films may be preheated in advance to the stretching treatment.

For stabilization of the film stretching process, various improvements for stabilization are added to the common stretching method. Such improvements include for example (i) control of stretching temperature, (ii) control of the internal heat evolution during stretching, (iii) control of preliminary heating (preheating) condition, (iv) uniformization of film surface temperature in the step related to stretching, and the like.

(i) Control of Stretching Temperature

In controlling the stretching temperature, the stretching temperature should be controlled so as not to be raised too high. When the stretching temperature is too high, the thickness distribution width of the resulting films sometimes becomes too large. In addition, when the stretching temperature is too high, the resulting heat-shrinkable films sometimes do not have toughness sufficient for loading the films onto containers (bottles and the like) at a high speed.

The stretching temperature is preferably controlled to a temperature of, for example, glass transition temperature (Tg)+40° C. or less (preferably Tg+15° C. or less).

The following has smaller influence on the thickness distribution width. The stretching temperature is preferably controlled at a temperature of the glass transition temperature (Tg)−20° C. or more (preferably Tg−5° C. or more) and Tg+40° C. or less (preferably less than Tg+15° C). When the stretching temperature is too low, the heat shrinkage percentage of the films sometimes become smaller and furthermore the transparency of the films decreases.

(ii) Control of the Internal Heat Evolution During Stretching

Suppression of the internal heat evolution in films during stretching allows reduction in variation of the temperature of the films in the stretching direction (width direction or the like), and thus increases in uniformity in thickness of the films (heat-shrinkable films) after stretching.

For suppressing the internal heat evolution, it is desirable to improve the speed of heating films by properly controlling the heating condition (e.g., by increasing the velocity of supplying heated air). Insufficient heating results in the internal heat evolution due to stretching orientation at the regions less heated, while when the films are thoroughly heated, the molecular chains therein are more easy to slide during the stretching, eliminating generation of the internal heat evolution.

When the heat condition is expressed in term of the coefficient of heat transfer, the coefficient of heat transfer is, for example, about 0.0038 J/cm$^2$·sec·° C. (0.0009 calorie/cm$^2$·sec·° C.), or more preferably about 0.0046 to 0.0071 J/cm$^2$·sec·° C. (0.0011 to 0.0017 calorie/cm$^2$·sec·° C.).

(iii) Control of Preliminary Heating (Preheating) Condition

In controlling the preliminary heating condition, it is desirable to heat films gradually. Gradual heating in the preheating process allows the films to have a temperature distribution almost uniform, and thus provides stretched films (heat-shrinkable films) improved in uniformity in thickness.

When the heat condition is expressed in term of the coefficient of heat transfer, the coefficient is for example about 0.00544 J/cm$^2$·sec·° C. (0.0013 calorie/cm$^2$·sec·° C.) or less. In addition, in the preliminary heating step, the film surface is preferably heated to a temperature in the range of Tg+0° C. to Tg+60° C., and the temperature of heated air used for heating is preferably about Tg+10° C. to Tg+90° C.

The methods for achieving the coefficient of heat transfer include for example a method of reducing the flow rate of the heated air and others.

(iv) Uniformization of the Film Surface Temperature in the Step Related to Stretching Reduction in variation of film surface temperature in the step related to stretching of films (uniformization of temperature) enables stretching and heat treatment of the films over the entire length at the same temperature, and uniformization in thickness distribution width and heat shrinkage properties.

With respect to the variation width of surface temperature, when the surface temperatures of the film are measured at desired points of the film, the temperatures are preferably in the range of, for example, the average temperature of the film±1° C., more preferably the average temperature±0.5° C.

Films are stretched through various steps, including the preheating process before stretching, stretching process, heat-treating process after stretching, relaxation process, restretching process, and the like. It is preferable to use a facility that controls the variation in film surface temperature (uniformization) in part or all of these steps. In particular, in order to uniformize the thickness distribution width of films over the entire length thereof, it is desirable to use a facility that can reduce the fluctuation in film surface temperature in the preheating and stretching processes (and additionally in the heat-treating process after stretching if needed). Alternatively, for uniformizing the heat shrinkage percentage property, it is desirable to use a facility that can reduce the fluctuation in film surface temperature in the stretching process.

The facilities that can reduce the fluctuation in film surface temperature are, for example, a facility equipped with a flow rate-controlling means of controlling the flow rate of the heated air that supplies heat to the film; a facility equipped with a heating means which is able to heat air by heating air consistently [a heating means using a low pressure steam at 500 kPa or less (5 kgf/cm$^2$ or less); and the like].

These methods, of (i) controlling the stretching temperature, (ii) controlling the internal heat evolution, (iii) controlling the preheating condition, and (iv) uniformizing the film surface temperature, may be used alone or in combination of two or more (particularly in combination of all).

[Thickness Distribution Width in the Film-running Direction of Film]

The maximum shrinkage direction is almost identical with the stretching direction (main stretching direction) of the film, and the stretching direction (main stretching direction) may be, as described above, either the length direction (film-running direction) or the width direction of the film. Accordingly, the thickness distribution in the maximum shrinkage direction sometimes indicates the thickness distribution width in the film-running direction of the film and sometimes the thickness distribution width in the width direction of the film.

When the thickness distribution in the maximum shrinkage direction is identical that in the width direction, thickness distribution width in the film-running direction may also be specified in addition to the thickness distribution width in the maximum shrinkage direction (width direction). In such a case, the thickness distribution width is preferably as follows:

When the initiation end of rolling of a film which was obtained from a steady region wherein physical properties of the film are uniformly controlled in the film-running direction is designated as the end <A>, and the termination end of rolling thereof as the end <B>; the first cut-off point of sample is placed at a position 2 m or less inner from the end <B> above, and the final cut-off point at a position 2 m or less inner from the end <A> above, and additionally a plurality of sample cut-off points at an interval of about 100 m from the first cut-off point; rectangular samples 20 cm in length in the film-running direction and 5 cm in width are cut off from the cut-off points; and the variation in film thickness of the respective samples in the film-running direction is measured, the thickness distribution width represented by the formula above of each sample is preferably 10% or less, preferably 9% or less, more preferably 8% or less, particularly preferably 5% or less.

Reduction of the thickness distribution width in the film-running direction prevents crinkling of the resulting films when then are printed or processed by solvent bonding using for example a center seal automatic bag making machine. In addition, it also prevents the fluctuation in tension when the films after printing are processed into the form suitable for loading onto containers and thus troubles such as partial lack of print and breakage.

The methods of uniformizing the thickness distribution width in the film-running direction include: a method similar to the aforementioned method of uniformizing the thickness distribution in the maximum shrinkage direction, i.e., the method of reducing the melt resistivity; the method of using a particular electrode: the method of uniformizing the raw polyesters used for film production (method of suppressing the segregation of raw materials); the method of stabilizing the casting process; the method of stabilizing the film stretching process; and the like.

[Fluctuation in Heat Shrinkage Percentage]

When the initiation end of rolling of a film which was obtained from a steady region wherein physical properties of the film are uniformly controlled in the film-running direction is designated as the end <A>, and the termination end of rolling thereof as the end <B>; the first cut-off point of sample is placed at a position 2 m or less inner from the end <A> above, and the final cut-off point at a position 2 m or less inner from the end <B> above, and additionally a plurality of sample cut-off points at an interval of about 100 m from the first cut-off point; square samples in a size of 10 cm×10 cm are cut off from respective cut-off points; the respective samples are immersed in hot water at 85° C. for 10 seconds, subsequently in water at 25° C. for 10 seconds, and withdrawn; and the heat shrinkage percentage in the maximum shrinkage direction thereof is measured and the average (average heat shrinkage percentage) thereof is calculated, the measured values of the heat shrinkage percentage of respective samples preferably fall in the range of the average (average heat shrinkage percentage)±3% (preferably±2%).

Namely, the absolute value of the difference ($|X-Y_n|$) between the heat shrinkage percentage $Y_n$ (%) of the respective samples and the average heat shrinkage percentage X (%) of all samples cut-off from the cut-off points above is preferably 3(%) or less [preferably 2(%) or less]. In other words, if both the difference between the maximum value of $Y_n$ ($Y_{max}$) and X and the difference between the minimum value ($Y_{min}$) and X are in the range of ±3% (or ±2%), such films satisfies the requirement above.

As described above, reduction in the fluctuation of heat shrinkage percentage of a heat-shrinkable film roll leads to reduction in heat shrinkage fluctuation of each piece of container-wrapping products (labels, bags, and the like), resulting in decrease in defect in the loading and shrinking step and drastic decrease in the number of defects in the products.

The methods for reducing the fluctuation in heat shrinkage percentage of respective samples include: a method similar to the case where the fluctuation in thickness distribution width in the maximum shrinkage direction among the samples, i.e., the method of reducing the melt resistivity; the method of uniformizing the raw polyester used for film production (method of suppressing the segregation of raw materials); the method of stabilizing the casting process; the method of stabilizing the film stretching process; and the like.

[Intrinsic Viscosity]

The film rolls according to the present invention preferably have an intrinsic viscosity of 0.66 dl/g or more. When the intrinsic viscosity of the heat shrinkage films is too low, the molecular weight of the polyester constituting the film is lower, which leads to reduction in the consistency of shrinkage stress during heat shrinkage, generation of disadvantages such as whitening due to shrinkage, shrinkage shading, and the like, and provides products poorer in product appearance property after heat shrinkage. In addition, decrease in the molecular weight of polyesters leads to decrease in the mechanical strength and breaking resistance of the films.

The intrinsic viscosity is preferably 0.67 dl/g or more, more preferably 0.68 dl/g or more. The intrinsic viscosity is usually about 1.30 dl/g or less (particularly about 0.8 dl/g or less).

The methods for increasing the intrinsic viscosity of films include for example methods of: (1) using a high molecular weight polyester as the raw polyester for the film (e.g., a method of using polyesters having an intrinsic viscosity of 0.7 dl/g or more, preferably 0.76 dl/g or more, more preferably 0.80 dl/g or more); (2) suppressing the pyrolysis and hydrolysis during the process of extruding the polyester into film (e.g., a method of extruding the raw polyesters after they are predried to a water content of about 100 ppm or less, preferably about 50 ppm or less); (3) using hydrolysis-resistant polyesters as the polyester (e.g., a method of using a polyester having an acid value of 25 eq/ton or less); (4) adding an antioxidant to the polyester (e.g., to a content of about 0.01 to 1 mass %); and the like.

[Heat Shrinkage Stress]

The heat-shrinkable polyester film rolls according to the present invention preferably have a higher heat shrinkage stress (maximum heat shrinkage stress) in the maximum shrinkage direction. Higher heat shrinkage stress prevents the looseness of the films after the films (labels and the like) are shrank around containers, and also prevents deterioration of the breaking resistance due to insufficient mechanical strength of the films.

The maximum heat shrinkage stress of the heat-shrinkable polyester film rolls according to the present invention is usually 3 MPa or more, preferably 3.5 MPa or more, more preferably 4 MPa or more, particularly preferably 7 MPa or more, when the heat shrinkage test is conducted in the condition of a temperature of 90° C. in heated air, a width of the sample of 20 mm, a distance between chucks of 100 mm.

Here, the maximum value of the heat shrinkage stress is determined specifically as follows.

(1) A sample with a length of 200 mm in the maximum shrinkage direction and a width of 20 mm is cut off from a heat-shrinkable film roll.

(2) A hot-air oven in a tensile tester fitted with a hot-air oven (e.g., Tensiron manufactured by Toyoseiki) is heated to 90° C. by supplying hot air in three directions respectively from back, left, and right (flow rate: 5 m/sec).

(3) Hot air supply is terminated and the sample is placed in the heating oven. Distances between the corresponding chucks are 100 mm (constant).

(4) After the cover of the heating oven was immediately closed and the supply of hot air (90° C., at a rate of 5 m/s) was resumed in the similar manner to (2) above, the heat shrinkage stress is measured.

(5) The maximum value determined from the resulting chart was regarded as the maximum heat shrinkage stress (MPa).

In order to control the maximum heat shrinkage stress in the predetermined range above, it is effective to adjust the composition of the polyester films. For example, it is effective to add, as the polyvalent alcohol component, the second alcohol components described as favorable in the section of [Heat Shrinkage Percentage], i.e., cyclic alcohol component (1,4-cyclohexane dimethanol component); diol component having about 3 to 6 carbons (propanediol component, butanediol component, hexanediol component, and the like), and the like. The content of these favorable second alcohol components may be the same as that described in the section of [Heat Shrinkage Percentage].

The polyesters used in the present invention may be prepared by melt polymerization, or other polymerization. The melt-polymerization methods include for example: a method of polycondensing oligomers obtained in the direct reaction of dicarboxylic acid and glycols (direct polymerization method); a method of reacting a carboxylic acid dimethylester derivative and a glycol by ester exchange and then polycondensing the resulting mixture (ester exchange method); and any other production methods. The degree of polymerization of the polyesters is preferably about 0.5 to 1.3 dl/g in intrinsic viscosity.

Polymerization catalysts used for the polymerization reaction include various conventional catalysts: for example, titanium-based catalysts, antimony-based catalysts, germanium-based catalysts, tin-based catalysts, cobalt-based catalysts, manganese-based catalysts, and the like, preferably titanium-based catalysts (titanium tetrabutoxide and the like), antimony-based catalysts (antimony trioxide and the like), germanium-based catalysts (germanium dioxide and the like), cobalt-based catalysts (cobalt acetate and the like), and the like.

The aforementioned compounds (alkali metal compounds, alkali-earth metal compounds, phosphorus-containing compounds, and the like) for reducing the melt resistivity may be added at any time, and may be added in any step, i.e., before the esterification reacting, during esterification, during the period after esterification and before the polymerization step, during polymerization, or after polymerization. They are preferably added at any time after the esterification step, more preferably during the period after the esterification step and before the polymerization step. If an alkali-earth metal compound and/or a phosphorus-containing compound (and if desired an alkali metal compound) are added after the esterification step, the amount of foreign materials generated declines significantly compared with the case where they are added before it.

In addition, fine particles such as silica, titanium dioxide, kaolin, calcium carbonate, and the like may be added to the raw materials of the films, and additionally antioxidants, UV absorbents, antistatic agents, discoloration agents, antibacterial agents, and the like may also be added.

The heat-shrinkable polyester films can be produced according to the conventional methods. Especially when a second alcohol component is added in the amount in a certain range to a heat-shrinkable polyester film, the methods for producing such films include methods of: using a copolymerization polyester (copolyester) alone; and blending a plurality of polyesters [e.g., blending a plurality of homopolyesters different from each other; blending a homopolyester (polyethylene terephthalate, or the like) and a copolyester; blending a plurality of copolyester different from each other; and the like].

In the method of using a copolyester alone, a copolyester containing a certain amount of a polyvalent alcohol component (second alcohol component or the like) may be used. The method of blending a plurality of polyesters is more favorably used, as it allows easy modification of the film properties just by changing the blending ratio and is compatible with commercial production of a wide variety of films.

In a typical example of the process of producing films, raw polyester chips are dried in a dryer (hopper drier, paddle drier, vacuum dryer, or the like), extruded into film by an extruder at a temperature of 200 to 300° C. Alternatively, undried polyester raw chips may be extruded into film in an analogous manner while water therein is being removed in a vent-type extruder. For extrusion, various conventional methods, such as the T die method, tubular method, and the like, may be employed. After extrusion, the extruded films are preferably cooled rapidly with a cooling roll such as a casting roll or the like into unstretched films.

The thickness of the heat-shrinkable polyester films is not particularly limited, but for example about 10 to 200 $\mu$m, preferably about 20 to 100 $\mu$m, for use in labels.

The heat-shrinkable polyester film rolls according to the present invention are produced by rolling the heat-shrinkable polyester films around a core. The size of the films in the film rolls is preferably 200 mm or more in width and 300 m or more in length. It is for raising the commercial utility value of the film rolls that the width is set at 200 mm or more. In addition, it is because the longer films have a tendency to have a larger fluctuation in thickness distribution width over the entire length of the films that the length is set at 300 m or more, and the present invention that suppresses the fluctuation in thickness distribution is of more value in such a case.

The width of the heat-shrinkable rolled films is preferably 300 mm or more, more preferably 400 mm or more. The length of the heat-shrinkable rolled films is preferably 400 m or more, more preferably 500 m or more.

The upper limit of width of the films is not particularly limited but generally 1,500 mm or less from the viewpoint of easier handling. Additionally, the upper limit of length of the films is also not particularly limited, but may be set according to the thickness of film. For example, the length of the films is preferably 6,000 m or less for films having a thickness of 45 $\mu$m.

Usually, plastic and metallic cores are used as the core. The diameter of these cores is for example about 2 to 10 inch (e.g., 3 inch, 6 inch, 8 inch, and the like).

The films according to the present invention are, as they have smaller melt resistivity, superior in uniformity in film thickness as well as in processability and printability. Further, the film rolls according to the present invention are superior in uniformity in thickness over the entire length (steady region) of the film rolled to the form of roll. Therefore, container-wrapping film superior in processability and printability can be obtained in high yield.

EXAMPLE

Hereinafter, the present invention will be described in more detail with reference to EXAMPLEs, but the following EXAMPLEs are not intended to limit the scope of the present invention, and it should be understood that the modification and the use in the scope of he present invention are also included in the present invention. Methods of measuring physical properties of the polyesters used in EXAMPLEs and COMPARATIVE EXAMPLEs (control examples) and the films obtained in EXAMPLEs and COMPARATIVE EXAMPLE (control examples) are as follows:

(1) Composition (1-1) Dicarboxylic Acid and Polyvalent Alcohol Components Samples (chips or films) were dissolved in a mixture of chloroform D (Euriso-top) and trifluoroacetic acid D1 (Euriso-top) at a ratio of 10:1 (volume ratio) to make sample solutions, and the proton NMR spectra of the sample solutions were obtained using an NMR spectrometer ("GEMINI-200"; Varian) under the measurement condition of a temperature of 23° C. and a scan number of 64. The composition of the monomeric constituents was calculated according to the respective proton peak intensity thereof obtained by NMR measurement.

(1-2) Metal Components

The contents of Na, Mg, and P in the samples (chips or films) were determined according to the following methods:

[Na]

2 g of a sample was placed in a platinum crucible and incinerated at a temperature of 500 to 800° C., then 5 ml of hydrochloric acid (at a concentration of 6 mol/L) was added to the residue, and the mixture was evaporated to dryness. The residue was redissolved in 10 ml of 1.2 mol/L hydrochloric acid, and the Na concentration was determined (by the calibration curve method), using an atomic absorption photometer ["AA-640-12"; Shimadzu Corp.].

[Mg]

2 g of a sample was placed in a platinum crucible and incinerated at a temperature of 500 to 800° C., then 5 ml of hydrochloric acid (at a concentration of 6 mol/L) was added to the residue, and the mixture was evaporated to dryness.

The residue was redissolved in 10 ml of 1.2 mol/L hydrochloric acid, and the Mg concentration was determined (by the calibration curve method), using an ICP spectrometer ["ICPS-200"; Shimadzu Corp.].

[P]

The phosphorus components in the samples were converted to orthophosphoric acid according to any one of the following methods (A) to (C). The orthophosphoric acid was converted in a reaction with a molybdate salt in sulfuric acid (at a concentration of 1 mol/L) to phosphomolybdic acid, which was reduced by addition of hydrazine sulfate. The concentration of the heteropoly acid salt (blue) thus generated was determined (by the calibration curve method) by measuring the absorbance at 830 nm, using an absorptiometer ["UV-150-02"; Shimadzu Corp.].

(A) Dry ashing of the sample and sodium carbonate in a platinum crucible;

(B) Wet decomposition in a sulfuric acid, nitric acid, and perchloric acid system; and (C) Wet decomposition in a sulfuric acid and perchloric acid system.

(2) Intrinsic Viscosity

The intrinsic viscosity was determined in Ostwald viscometer at 30±0.1° C. by using a solution of 0.1 g of a sample (film or chip) accurately weighed in 25 ml of phenol/tetrachloroethane=3/2 (mass ratio) mixture. Intrinsic viscosity [η] is calculated according to the following formula (Huggins equation).

$$[\eta] = \lim_{C \to 0} \frac{\eta_{sp}}{C}$$

$$\frac{\eta_{sp}}{C} = [\eta] + k[\eta]^2 C$$

$$\eta_{sp} = \frac{t - t_0}{t_0}$$

$\eta_{sp}$: Specific viscosity $t_0$: Solvent efflux time in Ostwald viscometer t: Film-solution efflux time in Ostwald viscometer C: Concentration of the film solution In real measurement, the intrinsic viscosity was calculated by the following approximate equation, i.e., the Huggins equation wherein k is 0.375.

$$\eta_r = \eta_{sp} + 1 = \frac{t}{t_0}$$

$$[\eta] = \frac{1}{1.6}\{(\eta_r - 1) + 3 \times \ln \eta_r\}$$

$\eta_r$: Relative viscosity (3) Residual Amount of Solid Matter (Foreign Materials)

2 g of the sample (chip or film) was dissolved in a mixed solution of phenol and tetrachloroethane [volume: 100 ml; phenol/tetrachloroethane=3/2 (mass ratio)]; the solution was filtered through a Teflon membrane filter (pore size: 0.1 μm) to collect solid matter; and the residual amount of solid matter was evaluated according to the following criteria.

None: There is no foreign material remaining on the membrane filter after filtration when examined by visual observation.

Trace: There are a trace amount of foreign materials remaining on the membrane filter after filtration when examined by visual observation.

Much: There are many foreign materials remaining all over the surface of membrane filter after filtration when examined by visual observation.

(4) Melt Resistivity

A pair of electrodes was inserted into a sample (chip or film) melted at a temperature of 275° C., and a voltage of 120 V was applied between them. The electric current was determined and the melt resistivity (Si; unit: Ω·cm) was calculated according to the following formula.

$$Si\ (\Omega \cdot cm) = (A/I) \times (V/io)$$

[wherein, A represents the surface area of the electrodes ($cm^2$); I, the distance between the electrodes (cm); V, the voltage (V); and io, the electric current (A).]

(5) Casting Performance

A tungsten wire electrode was placed between a T die of extruder and a casting roll, surface temperature thereof being controlled at 30° C., and a voltage of 7 to 10 kV was applied between the electrode and the casting roll. A resin was melt-extruded through the T die above at a temperature of 280° C., and the extruded film was brought into contact with the above electrode and cooled on the casting roll to produce a film having a thickness of 180 μm (casting speed: 30 m/min). Bubble-like defects generated on the surface of the film thus obtained were determined by visual examination, and the casting performance was classified according to the following criteria:

Excellent: No bubble-like defect generated

Good: Bubble-like defects generated locally

No good: Many bubble-like defects generated (6) Heat Shrinkage Percentage

The film rolls obtained in EXAMPLEs and COMPARATIVE EXAMPLEs were produced in the casting and stretching processes operated in a steady state over the entire region of the films from the initiation end of rolling to the termination end of rolling. Accordingly, the entire films correspond to steady region.

The first sample was cut off from the termination end of rolling of the film (0 m from the termination end), the second and the following samples, from points at an interval of about 100 m from the first cut-off point, and the final sample, from the initiation end of rolling of the film (0 m from the initiation end of rolling). Each sample was square with a size of 10 cm×10 cm. As will be described later, the length of the films was 1,000 m, and thus the number of samples was 11 all together.

The heat shrinkage percentage (%) is determined by immersing a sample in hot water at 85° C.±0.5° C. for 10 seconds under no load inducing heat shrinkage, thereafter in water at 25° C.±0.5° C. for 10 seconds, and subsequently measuring the lengths of the sample in the vertical and horizontal directions and by calculation according to the following equation.

Heat shrinkage percentage (%)=100×(length before shrinkage−Length after shrinkage)÷(Length before shrinkage)

In TABLE 2 below, the average (X) represents an average of the heat shrinkage percentages of all 11 samples measured; the maximum value (Ymax), a maximum value of the heat shrinkage percentages of 11 samples; the minimum value (Ymin), a minimum value of the heat shrinkage percentages of 11 samples. The differences between the maximum and minimum values and the average are also shown.

(7) Breaking Resistance (Breaking Percentage)

Tensile tests of the samples before heat shrinkage are conducted in the direction orthogonal to the maximum shrinkage direction of the film according to JIS K 7127. The number of the samples is 20. The tensile tests are conducted under the condition of a length of the sample of 200 mm, a distance between chucks of 100 mm, a width of the sample of 15 mm, a temperature of 23° C., and a stretching speed of 200 mm/min. The number of the samples broken at an elongation percentage 5% is counted, and the percentage of the broken samples in all samples (20 pieces) is designated as breaking percentage (%).

(8) Maximum Heat Shrinkage Stress

A sample having a length in the maximum shrinkage direction of 200 mm and a width of 20 mm was cut off from a shrinkable film roll. A tensile tester equipped with an oven ("Tensilon", Toyoseiki) is previously heated to 90° C. by hot air. After hot air supply has been terminated, the sample was held by the chucks at the positions 50 mm respectively from each ends so that the distance between the chucks becomes 100 mm. After closing the cover of the oven immediately, the sample was heated by supplying heated air once again in three directions, back, left and right, (flow rate: 5 m/sec). The shrinkage stress was measured, and the maximum value determined from the chart was designated as the maximum heat shrinkage stress (MPa).

(9) Thickness Distribution in the Maximum Shrinkage Direction

Sample 1 having a width of 5 cm and a length of 20 cm in the width direction (corresponding to the maximum shrinkage direction in the following EXAMPLEs and COMPARATIVE EXAMPLEs) was cut off from the film roll.

During the sampling above, the first sample was cut off from the film termination end of rolling (0 m from the termination end of rolling), the second and the following samples, from the points at a interval of about 100 m from the first cut-off point, and the last sample, from the film initiation end of rolling (0 m from the initiation end of rolling). As will be described below, the length of the film is 1000 m, and thus the number of the cut-off points of sample 1 is 11 all together, and 10 sample 1 were cut off from each cut-off point.

The thickness of the samples from each point in the longitudinal direction of the sample (i.e., maximum shrinkage direction) were determined by using a contact thickness gauge ["KG60/A"; Anritsu Corp.], and the thickness distribution width was calculated according to the following formula, and the average was designated as the thickness distribution width at the point.

Thickness distribution width=(Maximum thickness−Minimum thickness)/Average thickness×100

(10) Thickness Distribution Width in the Film-running Direction

The thickness distribution width in the film-running direction was determined in a similar manner to the measurement of the thickness distribution in the maximum shrinkage direction, except that the samples (sample 2) 20 cm in length in the film-running direction and 5 cm in width were used replacing sample 1.

(11) Printability

A film was withdrawn from a heat shrinkage film roll and printed with a grass green ink of Toyo Ink Mfg., all over the surface. Then, the film was further printed with gold and white inks in that order, using a lattice patterned heliogravure (lattice of 1 cm square). The number of crinkles generated during printing of 1000-m film was counted and the printability was evaluated according to the following criteria.

Excellent: 2 or less crinkles generated (Printability: good)
good: 3 to 6 crinkles generated No good: 7 or more crinkles generated

(12) Product Appearance Property After Heat Shrinkage

A film was withdrawn from a heat shrinkage film roll and processed into tubes by adhering it with a solvent. Those films that could not be processed by solvent bonding were processed into tubes by heat sealing. The tubes were then cut open to give labels of the heat-shrinkable polyester film. These tube labels were prepared from the same film roll.

Subsequently, the labels were loaded onto a 300-ml volume glass bottle, and allowed to shrink by moving the wrapped glass bottle through a heated air-type heat-shrinkage tunnel at 160° C. (heated air flow rate: 10 m/sec) over a period of 13 minutes. The extent of whitening due to shrinkage and shrinkage shading was determined by visual observation, and the product appearance property after heat shrinkage was evaluated according to the following criteria.

5: Excellent finish
4: Good finish
3: Slight whitening or shading are observed (2 or less spots)
2: Some whitening or shading are observed (3 to 5 spots)
1: Much shrinkage whitening or shading are observed (6 or more spots)

Rank 4 or more is acceptable, while rank 3 or less is unacceptable.

The numbers of the acceptable and unacceptable tubular labels were determined by evaluating the product appearance property after heat shrinkage of all labels obtained form the same film roll, and the product appearance property percentage (defective fraction %) was evaluated according to the following formula.

Product appearance property percentage=(Number of unacceptable tubular labels)÷(Number of all tubular labels examined)× 100(%)

Preparative Example 1

Preparation of Polyester 57036 mass parts of terephthalic acid (TPA), 35801 mass parts of ethylene glycol (EG), and 15843 mass parts of 1,4-cyclohexane dimethanol (CHDM) were placed in an esterification reactor, and the mixture was subjected to an esterification reaction at a pressure of 0.25 MPa and a temperature of 220 to 240° C. for 120 minutes while stirring. After the reactor was pressurized to atmospheric pressure, 6.34 mass parts of cobalt acetate tetrahydrate (polymerization catalyst), 8 mass parts of titanium tetrabutoxide (polymerization catalyst), and 132.39 mass parts of magnesium acetate tetrahydrate (alkali-earth metal compound), 5.35 mass parts of sodium acetate (alkali metal compound), and 61.5 mass parts of trimethyl phosphate (phosphorus compound) were added, and the mixture was stirred at a temperature of 240° C. for 10 minutes and then depressurized to a pressure of 0.5 hPa and heated to a temperature of 280° C. over a period of 75 minutes. The mixture was stirred (for about 40 minutes) at a temperature of 280° C. until the melt viscosity thereof became 7,000 poises, and then extruded in the form of strands into water. The strands were cut by a strand cutter to give polyester chip A.

Preparative Example 2 to 6

Polyester chips B to F set forth in TABLEs 1 to 2 were prepared in the similar manner to PREPARATIVE EXAMPLE 1.

The composition and physical properties of each polyester chip were summarized in TABLEs 1 and 2.

TABLE 1

|  |  |  | Chip A | Chip B | Chip C | Chip D | Chip E | Chip F |
|---|---|---|---|---|---|---|---|---|
| Chip composition | Dicarboxylic acid component (mole %) | TPA | 100 | 100 | 100 | 100 | 100 | 100 |
|  | Polyvalent alcohol component (mole %) | CHDM | 32 | 32 | 32 | — | — | 32 |
|  |  | EG | 67 | 67 | 67 | 99 | — | 67 |
|  |  | BD | — | — | — | — | 99 | — |
|  |  | PD | — | — | — | — | — | — |
|  |  | DEG | 1 | 1 | 1 | 1 | 1 | 1 |
|  | Alkali metal $M^1$ (ppm) | Na | 20 | 20 | 2 | — | — | 20 |
|  | Alkali earth metal $M^2$ (ppm) | Mg | 180 | — | 180 | 81 | 39 | 180 |
|  | Phosphorus atom (ppm) |  | 78 | — | 120 | 58 | — | 78 |
|  | Mass ratio ($M^2$/P) |  | 2.31 | — | 1.50 | 1.40 | — | 2.31 |
|  | Metal catalyst (ppm) | Ti | 15 | 15 | 15 | — | 90 | 15 |
|  |  | Co | 20 | 20 | 20 | — | — | 20 |
|  |  | Sb | — | — | — | 160 | — | — |
| Chip physical properties | Intrinsic viscosity (dl/g) |  | 0.77 | 0.83 | 0.82 | 0.75 | 0.70 | 0.77 |
|  | Residual amount of solid matter |  | trace | trace | trace | none | none | trace |
|  | Melt resistivity ($\times 10^8$ Ω · cm) |  | 0.15 | 2.55 | 0.71 | 0.22 | 10.7 | 0.16 |

TABLE 2

|  | Chip shape | Chip A | Chip B | Chip C | Chip D | Chip E | Chip F | Description |
|---|---|---|---|---|---|---|---|---|
| Absolute value | Major axis of the cross section (mm) | 3.4 | 3.5 | 3.4 | 3.9 | 3.6 | 2.8 |  |
|  | Minor axis of the cross section (mm) | 2.7 | 2.7 | 2.7 | 2.6 | 2.9 | 2.2 |  |
|  | Chip length (mm) | 4.1 | 4.0 | 4.0 | 3.8 | 3.6 | 2.2 |  |
| Relative value | Major axis of the cross section (relative to chip A) | 100 |  |  | 114(+14%) | 106(+6%) |  | Compositions of EXAMPLEs 1 AND 2 |
|  | Minor axis of the cross section (relative to chip A) | 100 |  |  | 96(−4%) | 107(+7%) |  |  |
|  | Chip length (relative to chip A) | 100 |  |  | 93(−7%) | 88(−12%) |  |  |
|  | Major axis of the cross section (relative to chip B) |  | 100 |  | 111(+11%) | 103(+3%) |  | Composition of COMPARATIVE EXAMPLE 1 |
|  | Minor axis of the cross section (relative to chip B) |  | 100 |  | 96(−4%) | 107(+7%) |  |  |
|  | Chip length (relative to chip B) |  | 100 |  | 95(−5%) | 88(−12%) |  |  |
|  | Major axis of the cross section (relative to chip C) |  |  | 100 | 115(+15%) | 106(+6%) |  | Composition of COMPARATIVE EXAMPLE 2 |
|  | Minor axis of the cross section (relative to chip C) |  |  | 100 | 96(−4%) | 107(+7%) |  |  |
|  | Chip length (relative to chip C) |  |  | 100 | 95(−5%) | 90(−10%) |  |  |
|  | Major axis of the cross section (relative to chip D) | 115(+15%) |  |  | 100 | 92(−8%) |  | Composition of EXAMPLE 3 |
|  | Minor axis of the cross section (relative to chip D) | 96(−4%) |  |  | 100 | 112(+12%) |  |  |
|  | Chip length (relative to chip D) | 93(−7%) |  |  | 100 | 95(−5%) |  |  |
|  | Major axis of the cross section relative to chip F) |  |  |  | 139(+39%) | 129(+29%) | 100 | Composition of COMPARATIVE EXAMPLE 3 |
|  | Minor axis of the cross section (relative to chip F) |  |  |  | 118(+18%) | 132(+32%) | 100 |  |
|  | Chip length (relative to chip F) |  |  |  | 173(+73%) | 164(+64%) | 100 |  |

In the table above, the content of inorganic components (Na, Mg, P, Ti, Co, and Sb) was expressed in term of the concentration of respective atoms (unit: ppm; mass basis). Each inorganic component is derived from the following source.

Na: Derived mainly from sodium acetate
Mg: Derived mainly from magnesium acetate tetrahydrate
P: Derived mainly from trimethyl phosphate
Ti: Derived mainly from titanium tetrabutoxide
Co: Derived mainly from cobalt acetate tetrahydrate
Sb: Derived mainly from antimony trioxide Further in the table, abbreviations used are as follows:
TPA: terephthalic acid
EG: ethylene glycol
CHDM: 1,4-cyclohexane dimethanol
BD: 1,4-butanediol
DEG: diethylene glycol Example 1

Each chip obtained in the PREPARATIVE EXAMPLEs above was separately predried. Chips A, D, and E were supplied continuously into a hopper immediately above an extruder using a quantitative screw feeder respectively, and the mixture was blended in the hopper (chip A: 52 mass %, chip D: 38 mass %, and chip E: 10 mass %). The blended chips were extruded in a molten state at a temperature of 280° C. using an extruder, and the resulting extruded film was rapidly cooled by a casting roll (chromium-plated roll) having a surface temperature controlled at 30° C.±1° C. to give an unstretched film having a thickness of 180 µm.

During the extrusion above, the extruded unsolidified film was electrostatically brought into contact with the casting roll, by applying electricity through a tungsten wire (diameter: 0.25 mm) on the film (applied voltage: 9.5 kV, electric current: 4 mmA), which was placed at the position facing the film. In addition, the wire was supplied continuously from one side and wound at the other side at a velocity of 1.8 m/hr.

The hopper used had a capacity of 150 kg of chips, and the discharge rate of the extruder was 450 kg per hour. Further, the inclination angle of the side wall of hopper was 70°.

The unstretched films were continuously stretched over a span of 1,000 m or more. The unstretched films were preheated at 91° C. for 10 seconds, stretched 4.0 times in the traverse direction at a temperature of 72° C. by a tenter, and subsequently heat-treated at a temperature of 79° C. for 10 seconds to give a heat-shrinkable polyester film having a thickness of 45 µm. The variations in film surface temperature during the continuous production of the heat-shrinkable film 1000 m in length were within the range of the average temperature±0.8° C. in the preheating process; average temperature±0.6° C. in the stretching process; and average temperature±0.5° C. in the heat-treating process. Each film thus obtained was slit into films with a 400 mm width and a 1000 m length, which were rolled around a 3-inch paper tube to give a heat-shrinkable film roll. The composition and physical properties of the film rolls obtained are summarized in TABLE 3.

Example 2

According to the procedure described in EXAMPLE1 except that the unstretched film was preheated at a temperature of 78° C. for 10 seconds, stretched 4.0 times in the traverse direction at temperature of 73° C. by a tenter, and heat-treated at a temperature of 80° C. for 10 minutes, a heat-shrinkable film roll was prepared using blended chips consisting of chip A (71 mass %), chip D (4 mass %), and chip E (25 mass %). The composition and physical properties of the film roll obtained are set forth in TABLE 3.

Comparative Example 1

A heat-shrinkable film roll was prepared in a similar manner to EXAMPLE 2 except that blended chip consisting of chip B (71 mass %), chip D (4 mass %), and chip E (25 mass %) was used. The composition and physical properties of the film roll obtained are set forth in TABLE 3.

Comparative Example 2

A heat-shrinkable film roll was prepared in a similar manner to EXAMPLE 2 except that blended chip consisting of chip C (71 mass %), chip D (4 mass %), and chip E (25 mass %) was used. The composition and physical properties of the film roll obtained are set forth in TABLE 3.

Example 3

According to the procedure described in EXAMPLE 2 except that the unstretched film was preheated at a temperature of 78° C. for 10 seconds, stretched 4.0 times in the traverse direction at temperature of 73° C. by a tenter, and subsequently heat-treated at a temperature of 80° C. for 10 minutes, a heat-shrinkable film roll was prepared using blended chips consisting of chip A (10 mass %), chip D (64 mass %), and chip E (26 mass %). The composition and physical properties of the film roll obtained are set forth in TABLE 3.

Comparative Example 3

Each chip obtained in the PREPARATIVE EXAMPLEs above was predried separately. Chips F, D, and E were supplied continuously into a hopper immediately above an extruder using a quantitative screw feeder respectively, and the mixture was blended in the hopper (chip F: 71 mass %, chip D: 4 mass %, and chip E: 25 mass %). The blended chips were extruded in a molten state at a temperature of 280° C. using an extruder, and the resulting extruded film was rapidly cool by a casting roll to give an unstretched film having a thickness of 180 µm. The hopper used had a capacity of 400 kg of chips, and the discharge rate of the extruder was 450 kg per hour. Further, the inclination angle of the side wall of hopper was 60°.

The unstretched film was continuously stretched over a span of 1,000 m or more. The unstretched film was preheated at 78° C. for 10 seconds, stretched 4.0 times in the traverse direction at a temperature of 73° C. by a tenter, and subsequently heat-treated at a temperature of 80° C. for 10 seconds to give a heat-shrinkable polyester film having a thickness of 45 µm. The variations in film surface temperature during the continuous production of the heat-shrinkable film 1,000 m in length were within the range of the average temperature±1.0° C. in the preheating process; average temperature±2.5° C. in the stretching process; and average temperature±2.0° C. in the heat-treating process. The film thus obtained was slit into films with a 400 mm width and a 1000 m length, which were rolled around a 3-inch paper tube to give heat-shrinkable film roll. The composition and physical properties of the film roll obtained are set forth in TABLE 3.

TABLE 3

|  |  | EX. 1 | EX. 2 | C. EX. 1 | C. EX. 2 | EX. 3 | C. EX 3 |
| --- | --- | --- | --- | --- | --- | --- | --- |
| Chip | Chip A (mass %) | 52 | 71 | — | — | 10 | — |
| composition | Chip B (mass %) | — | — | 71 | — | — | — |
|  | Chip C (mass %) | — | — | — | 71 | — | — |
|  | Chip D (mass %) | 38 | 4 | 4 | 4 | 64 | 4 |
|  | Chip E (mass %) | 10 | 25 | 25 | 25 | 26 | 25 |
|  | Chip F (mass %) | — | — | — | — | — | 71 |

TABLE 3-continued

| | | | EX. 1 | EX. 2 | C. EX. 1 | C. EX. 2 | EX. 3 | C. EX 3 |
|---|---|---|---|---|---|---|---|---|
| Film roll Composition | Dicarboxylic acid Component (mole %) | TPS | 100 | 100 | 100 | 100 | 100 | 100 |
| | Polyvalent alcohol Component (mole %) | EG | 70.9 | 50.6 | 50.7 | 50.7 | 69.8 | 50.9 |
| | | CHDM | 17.5 | 23.9 | 23.8 | 23.8 | 3.4 | 23.8 |
| | | BD | 9.6 | 23.4 | 23.3 | 23.5 | 24.9 | 23.3 |
| | | DEG | 2.0 | 2.1 | 2.2 | 2.0 | 1.9 | 2.0 |
| | Alkali metal $M^1$ (ppm) | Na | 10 | 14 | 14 | 1 | 14 | 14 |
| | Alkali earth metal $M^2$ (ppm) | Mg | 127 | 140 | 13 | 140 | 80 | 140 |
| | Phosphorus atom (ppm) | | 63 | 58 | 15 | 88 | 44 | 57 |
| | Mass ratio ($M^2$/P) | | 2.02 | 2.41 | 0.87 | 1.59 | 1.82 | 2.46 |
| Film roll Physical properties | Residual amount of solid matter | | trace | trace | trace | trace | trace | trace |
| | Melt resistivity ($\times 10^8$ Ω · cm) | | 0.29 | 0.28 | 1.18 | 1.5 | 0.26 | 0.26 |
| | Casting performance | | Exc. | Exc. | Good | NG | Exc. | Exc. |
| | Heat shrinkage percentage (%) | Average (X) | 44.7 | 58.8 | 59.0 | 58.2 | 40.5 | 58.0 |
| | | Maximum (Ymax) | 46.2 | 60.4 | 60.5 | 59.5 | 41.7 | 61.7 |
| | | Minimum (Ymin) | 43.4 | 57.8 | 57.6 | 56.9 | 39.4 | 51.2 |
| | | Ymax – X | 1.5 | 1.6 | 1.5 | 1.3 | 1.2 | 3.7 |
| | | X – Ymin | 1.3 | 1.0 | 1.4 | 1.3 | 1.1 | 6.8 |
| | Intrinsic viscosity (dl/g) | | 0.73 | 0.72 | 0.74 | 0.73 | 0.72 | 0.70 |
| | Breaking percentage (%) | | 0 | 0 | 0 | 0 | 0 | 0 |
| | Maximum heat-shrinkage stress (MPa) | | 7.6 | 8.3 | 8.1 | 8.2 | 8.9 | 8 |
| | Thickness distribution (%) | [film-running direction] | | | | | | |
| | | Maximum | 4.4 | 4.2 | 4.9 | 4.3 | 4.7 | 14.4 |
| | | Minimum | 3.0 | 2.7 | 3.3 | 2.6 | 3.0 | 3.5 |
| | | Average | 3.8 | 3.5 | 4.2 | 3.5 | 3.8 | 11.5 |
| | | [Width direction] | | | | | | |
| | | Maximum | 4.7 | 5.2 | 9.4 | 11.2 | 5.4 | 10.6 |
| | | Minimum | 3.5 | 3.7 | 7.3 | 7.2 | 3.8 | 7.2 |
| | | Average | 4 | 4.3 | 8.1 | 9.0 | 4.5 | 8.3 |
| | Printability | | Exc. | Exc. | Good | Good | Exc. | NG |
| | Product appearance property after heat shrinkage (defective fraction %) | | 0.0 | 0.0 | 6.2 | 7.3 | 96.5 | 17.3 |

INDUSTRIAL APPLICABILITY

The heat-shrinkable polyester film rolls according to the present invention are superior in uniformity in film thickness as well as in processability and printability. Additionally, container-wrapping films may be obtained in high yield. Accordingly, the heat-shrinkable polyester film rolls are useful for production of labels for decorating containers.

What is claimed is:

1. A heat-shrinkable polyester film roll, comprising:
an alkali-earth metal compound and a phosphorus compound, at an alkali-earth metal atom $M^2$ content of 20 to 400 ppm (mass basis) and a phosphorus atom P content of 5 to 350 ppm (mass basis) in the film, wherein:

(1) when square samples cut off from said film roll in a size of 10 cm×10 cm are immersed in hot water at 85° C. for 10 seconds, subsequently in water at 25° C. for 10 seconds, and withdrawn, the heat shrinkage percentage of the samples in the maximum shrinkage direction is 20% or more; and (2) when the termination end of rolling of the film which is obtained from a steady region wherein physical properties of the film are stabilized in the firm-running direction is designated as end <A>, and the initiation end of rolling thereof as end <B>; the first cut-off point of sample is placed at a position 2 m or less inner from end <A> above, and the final cut-off point at a position 2 m or less inner from end <B> above, and additionally a plurality of sample cut-off points at an interval of about 100 m from the first cut-off point; rectangular samples 20 cm in length in the maximum shrinkage direction of the film and 5 cm in width are cut off from the cut-off points; and the variations in thickness of respective samples in the maximum shrinkage direction are measured, the thickness distribution width of each sample represented by the following formula is 7% or less, Thickness distribution width=(Maximum thickness–Minimum thickness)/Average thickness×100.

2. The heat-shrinkable polyester film roll according to claim 1, wherein said film's maximum shrinkage direction, having a thickness distribution width of 7% or less, is orthogonal to the film-running direction;

and when the termination end of rolling of the film which is obtained from steady region wherein physical properties of the film are stabilized in the film-running direction is designated as end <A>, and the initiation end of rolling thereof as end <B>; the first cut-off point of sample is placed at a position 2 m or less inner from end <A> above, and the final cut-off point at a position 2 m or less inner from end <B> above, and additionally a plurality of sample cut-off points at an interval of about 100 m from the first cut-off point; rectangular samples 20 cm in length in the film-running direction and 5 cm in width are cut off from the cut-off points; and the variations in thickness of respective samples in said film-running direction are measured, the thickness distribution width of each sample represented by the above formula is preferably 10% or less.

3. The heat-shrinkable polyester film roll according to claim 1, wherein said film further comprises an alkali metal compound, at an alkali metal atom $M^1$ content of 0 to 100 ppm (mass basis).

4. The heat-shrinkable polyester film roll according to claim 1 which is produced by extruding a molten polyester from an extruder with charging the extruded film with electricity from an electrode, before the film is cooled by an electroconductive cooling coil, and thus bringing the extruded film into tighter contact with the cooling roll, wherein the electrode is placed between the extruder and the cooling roll, and is provided with a withdrawal device for withdrawing the stained surface of the electrode and a supplying device for supplying fresh unstained surface of the electrode.

5. The heat-shrinkable polyester film roll according to claim 1, wherein said heat-shrinkable polyester film is a polyethylene terephthalate-based film.

6. The heat-shrinkable polyester film roll according to claim 5, wherein said heat-shrinkable polyester film comprises, in addition to an ethylene glycol component as a polyvalent alcohol component constituting said base unit, a second alcohol component, at an amount of 10 to 70 mole % with respect to the total amount of polyvalent alcohol components (100%).

7. The heat-shrinkable polyester film roll according to claim 6, wherein said second alcohol component is at least one component selected from cyclic alcohol components and diol components having 3 to 6 carbons.

8. The heat-shrinkable polyester film roll according to claim 7, wherein said cyclic alcohol component is a 1,4-cyclohexane dimethanol component.

9. The heat-shrinkable polyester film roll according to claim 8, wherein said heat-shrinkable polyester film comprises the 1,4-cyclohexane dimethanol component in an amount of 5 mole % or more with respect to the total amount of polyvalent alcohols (100%).

10. The heat-shrinkable polyester film roll according to claim 8, wherein said heat-shrinkable polyester film comprises the 1,4-cyclohexane dimethanol component in an amount of 10 to 80 mole % with respect to the total amount of polyvalent alcohols (100%).

11. The heat-shrinkable polyester film roll according to claim 1, wherein when the termination end of rolling of the film which is obtained from steady region wherein physical properties of the film are stabilized in the film-running direction is designated as end <A>, and the initiation end of rolling thereof as end <B>; the first cut-off point of sample is placed at a position 2 m or less inner from end <A> above, and the final cut-off point at a position 2 m or less inner from rend <B> above, and additionally a plurality of sample cut-off points at an interval of about 100 m from the first cut-off point; square samples cut off from respective cut-off points in a size of 10 cm×10 cm are immersed in hot water at 85° C. for 10 seconds, subsequently in water at 20° C. for 10 seconds, and withdrawn; and the heat shrinkage percentage of the samples in the maximum shrinkage direction is measured and the average is calculated, measured values of the heat shrinkage percentage of respective samples are in the range of the average±3%.

12. The heat-shrinkable polyester film roll according to claim 1, wherein the intrinsic viscosity thereof is 0.66 dl/g or more.

13. The heat-shrinkable polyester film roll according to claim 1, wherein said heat-shrinkable film is 200 mm or more in width and 300 m or more in length.

14. The heat-shrinkable polyester film roll according to claim 1, wherein the samples cut off from said film roll have a melt resistivity of $0.70 \times 10^8$ Ω·cm or less at a temperature of 275° C.

15. A heat-shrinkable polyester film roll, comprising:

an alkali-earth metal compound and a phosphorus compound, and the mass ratio ($M^2$/P) of the alkali-earth metal atom $M^2$ to the phosphorus atom P in the film is 1.2 to 5.0, wherein:

(1) when square samples cut off from said film roll in a size of 10 cm×10 cm are immersed in hot water at 85° C. for 10 seconds, subsequently in water at 25° C. for 10 seconds, and withdrawn, the heat shrinkage percentage of the samples in the maximum shrinkage direction is 20% or more; and (2) when the termination end of rolling of the film which is obtained from a steady region wherein physical properties of the film are stabilized in the firm-running direction is designated as end <A>, and the initiation end of rolling thereof as end <B>; the first cut-off point of sample is placed at a position 2 m or less inner from end <A> above, and the final cut-off point at a position 2 m or less inner from end <B> above, and additionally a plurality of sample cut-off points at an interval of about 100 m from the first cut-off point; rectangular samples 20 cm in length in the maximum shrinkage direction of the film and 5 cm in width are cut off from the cut-off points; and the variations in thickness of respective samples in the maximum shrinkage direction are measured, the thickness distribution width of each sample represented by the following formula is 7% or less, Thickness distribution width=(Maximum thickness−Minimum thickness)/Average thickness×100.

16. The heat-shrinkable polyester film roll according to claim 15, wherein said film further comprises an alkali metal compound, at an alkali metal atom $M^1$ content of 0 to 100 ppm (mass basis).

* * * * *

UNITED STATES PATENT AND TRADEMARK OFFICE
CERTIFICATE OF CORRECTION

| | |
|---|---|
| PATENT NO. | : 6,958,178 B2 |
| APPLICATION NO. | : 10/480844 |
| DATED | : October 25, 2005 |
| INVENTOR(S) | : Hayakawa et al. |

Page 1 of 1

It is certified that error appears in the above-identified patent and that said Letters Patent is hereby corrected as shown below:

| Column | Line | |
|---|---|---|
| 13 | 6 | Change "loom" to --100m--. |

Signed and Sealed this

Eighth Day of August, 2006

JON W. DUDAS
*Director of the United States Patent and Trademark Office*